US010359545B2

United States Patent
Smith

(10) Patent No.: US 10,359,545 B2
(45) Date of Patent: Jul. 23, 2019

(54) FRESNEL LENS WITH REDUCED DRAFT FACET VISIBILITY

(71) Applicant: Lockheed Martin Corporation, Bethesda, MD (US)

(72) Inventor: David A. Smith, Cary, NC (US)

(73) Assignee: Lockheed Martin Corporation, Bethesda, MD (US)

( * ) Notice: Subject to any disclaimer, the term of this patent is extended or adjusted under 35 U.S.C. 154(b) by 426 days.

(21) Appl. No.: 14/858,733

(22) Filed: Sep. 18, 2015

(65) Prior Publication Data

US 2016/0011341 A1 Jan. 14, 2016

Related U.S. Application Data

(63) Continuation-in-part of application No. 13/211,365, filed on Aug. 17, 2011, now Pat. No. 9,632,315.

(Continued)

(51) Int. Cl.
| | | |
|---|---|---|
| *G02B 27/14* | (2006.01) | |
| *G02B 3/08* | (2006.01) | |
| *G02B 27/01* | (2006.01) | |

(52) U.S. Cl.
CPC .......... *G02B 3/08* (2013.01); *G02B 27/0172* (2013.01); *G02B 2027/012* (2013.01); *G02B 2027/013* (2013.01); *G02B 2027/0123* (2013.01)

(58) Field of Classification Search
CPC .............. G02B 3/08; G02B 27/0172; G02B 2027/012; G02B 2027/013; G02B 2027/0123
See application file for complete search history.

(56) References Cited

U.S. PATENT DOCUMENTS

| 3,880,509 A | 4/1975 | Herndon |
|---|---|---|
| 4,026,641 A | 5/1977 | Bosserman et al. |
| (Continued) | | |

FOREIGN PATENT DOCUMENTS

| CA | 2750287 A1 | 11/2011 |
|---|---|---|
| CA | 2750287 C | 11/2011 |
| (Continued) | | |

OTHER PUBLICATIONS

First Office Action for Chinese Patent Application No. 201180067287.4, dated Feb. 4, 2015, 11 pages.

(Continued)

*Primary Examiner* — Alicia A Harrington
(74) *Attorney, Agent, or Firm* — Withrow & Terranova, PLLC

(57) ABSTRACT

A curved Fresnel lens is provided. The Fresnel lens includes a grooved surface and a smooth surface. The grooved surface includes a plurality of concentric sloped facets and a plurality of concentric draft facets. Pairs of concentric draft facets and concentric sloped facets form a plurality of concentric grooves in the grooved surface. The concentric sloped facets are configured to focus light toward an eye of a nominal user. At least some of the concentric draft facets are congruent with conical surfaces of respective imaginary light cones that have corresponding vertices that originate from respective focal points, wherein each imaginary light cone extends through the Fresnel lens at an angle based in part on an index of refraction of the Fresnel lens and extends beyond the grooved surface into free space.

17 Claims, 9 Drawing Sheets

Related U.S. Application Data

(60) Provisional application No. 61/405,440, filed on Oct. 21, 2010, provisional application No. 61/417,325, filed on Nov. 26, 2010, provisional application No. 61/417,326, filed on Nov. 26, 2010, provisional application No. 61/417,327, filed on Nov. 26, 2010, provisional application No. 61/417,328, filed on Nov. 26, 2010, provisional application No. 61/427,530, filed on Nov. 26, 2010.

(56) References Cited

U.S. PATENT DOCUMENTS

| | | | |
|---|---|---|---|
| 4,176,468 | A | 12/1979 | Marty, Jr. |
| 4,293,196 | A * | 10/1981 | Hilbert ............... G02B 3/08 348/784 |
| 4,406,532 | A | 9/1983 | Howlett |
| H000423 | H * | 2/1988 | Mohon ............... G02B 3/08 359/742 |
| 5,184,250 | A | 2/1993 | Lacroix |
| 5,253,116 | A | 10/1993 | Lacroix |
| 5,309,169 | A | 5/1994 | Lippert |
| 5,325,386 | A | 6/1994 | Jewell et al. |
| 5,347,400 | A | 9/1994 | Hunter |
| 5,388,990 | A | 2/1995 | Beckman |
| 5,436,763 | A | 7/1995 | Chen et al. |
| 5,561,538 | A | 10/1996 | Kato et al. |
| 5,572,343 | A | 11/1996 | Okamura et al. |
| 5,581,271 | A | 12/1996 | Kraemer |
| 5,641,288 | A | 6/1997 | Zaenglein, Jr. |
| 5,699,194 | A | 12/1997 | Takahashi |
| 5,701,132 | A | 12/1997 | Kollin et al. |
| 5,701,202 | A | 12/1997 | Takahashi |
| 5,712,649 | A | 1/1998 | Tosaki |
| 5,714,967 | A | 2/1998 | Okamura et al. |
| 5,715,094 | A | 2/1998 | Ansley et al. |
| 5,754,344 | A | 5/1998 | Fujiyama |
| 5,757,544 | A | 5/1998 | Tabata et al. |
| 5,774,268 | A | 6/1998 | Takahashi |
| 5,798,738 | A | 8/1998 | Yamada |
| 5,798,739 | A | 8/1998 | Teitel |
| 5,803,738 | A | 9/1998 | Latham |
| 5,834,676 | A | 11/1998 | Elliott |
| 5,844,530 | A | 12/1998 | Tosaki |
| 5,936,663 | A | 8/1999 | Tabata et al. |
| 5,982,343 | A | 11/1999 | Iba et al. |
| 5,999,147 | A | 12/1999 | Teitel |
| 6,038,387 | A | 3/2000 | Machida |
| 6,140,979 | A | 10/2000 | Gerhard et al. |
| 6,140,980 | A | 10/2000 | Spitzer et al. |
| 6,160,666 | A | 12/2000 | Rallison et al. |
| 6,185,045 | B1 | 2/2001 | Hanano |
| 6,201,646 | B1 | 3/2001 | Togino et al. |
| 6,215,593 | B1 | 4/2001 | Bruce |
| 6,266,194 | B1 | 7/2001 | Tanijiri et al. |
| 6,347,869 | B1 * | 2/2002 | Xu ............... G02C 7/14 351/159.58 |
| 6,407,724 | B2 | 6/2002 | Waldern et al. |
| 6,445,362 | B1 | 9/2002 | Tegreene |
| 6,504,658 | B1 | 1/2003 | Bignolles et al. |
| 6,522,474 | B2 | 2/2003 | Cobb et al. |
| 6,529,331 | B2 | 3/2003 | Massof et al. |
| 6,549,332 | B2 | 4/2003 | Kimura |
| 6,611,253 | B1 | 8/2003 | Cohen |
| 6,633,304 | B2 | 10/2003 | Anabuki et al. |
| 6,646,811 | B2 | 11/2003 | Inoguchi |
| 6,704,128 | B2 | 3/2004 | Takeyama et al. |
| 6,731,434 | B1 | 5/2004 | Hua et al. |
| 6,751,026 | B2 | 6/2004 | Tomono |
| 6,771,423 | B2 | 8/2004 | Geist |
| 6,788,442 | B1 | 9/2004 | Potin et al. |
| 6,795,042 | B1 | 9/2004 | Nagata et al. |
| 6,813,085 | B2 | 11/2004 | Richards |
| 6,829,087 | B2 | 12/2004 | Freese et al. |
| 6,873,471 | B2 | 3/2005 | Coates et al. |
| 6,919,866 | B2 | 7/2005 | Kanevsky et al. |
| 6,919,867 | B2 | 7/2005 | Sauer |
| 6,963,379 | B2 | 11/2005 | Tomono |
| 7,002,551 | B2 | 2/2006 | Azuma et al. |
| 7,009,773 | B2 | 3/2006 | Chaoulov et al. |
| 7,016,116 | B2 * | 3/2006 | Dolgoff ............... G02B 27/2278 348/E13.042 |
| 7,063,256 | B2 | 6/2006 | Anderson et al. |
| 7,068,444 | B2 | 6/2006 | Nishi |
| 7,072,096 | B2 | 7/2006 | Holman et al. |
| 7,088,516 | B2 | 8/2006 | Yagi et al. |
| 7,095,562 | B1 | 8/2006 | Peng et al. |
| 7,110,013 | B2 | 9/2006 | Ebersole et al. |
| 7,119,965 | B1 | 10/2006 | Rolland et al. |
| 7,151,639 | B2 | 12/2006 | Lung |
| 7,295,377 | B2 | 11/2007 | Edelmann |
| 7,307,791 | B2 | 12/2007 | Li et al. |
| 7,324,081 | B2 | 1/2008 | Friedrich et al. |
| 7,339,742 | B2 | 3/2008 | Amitai et al. |
| 7,385,600 | B2 | 6/2008 | Marion |
| 7,391,573 | B2 | 6/2008 | Amitai |
| 7,407,106 | B2 | 8/2008 | Yee et al. |
| 7,432,879 | B2 | 10/2008 | Schonlau |
| 7,446,941 | B2 | 11/2008 | Fukuda |
| 7,499,217 | B2 | 3/2009 | Cakmakci et al. |
| 7,545,571 | B2 | 6/2009 | Garoutte et al. |
| 7,547,101 | B2 | 6/2009 | Fuziak, Jr. |
| 7,573,525 | B2 | 8/2009 | Yamasaki |
| 7,605,773 | B2 | 10/2009 | Janssen |
| 7,613,356 | B2 | 11/2009 | Uchiyama et al. |
| 7,623,294 | B2 | 11/2009 | Harada et al. |
| 7,626,562 | B2 | 12/2009 | Iwasaki |
| 7,656,585 | B1 | 2/2010 | Powell et al. |
| 7,663,793 | B1 | 2/2010 | Doucet |
| 7,732,694 | B2 | 6/2010 | Rosenberg |
| 7,751,122 | B2 | 7/2010 | Amitai |
| 7,765,083 | B2 | 7/2010 | Zank et al. |
| 7,804,507 | B2 | 9/2010 | Yang et al. |
| 7,812,815 | B2 | 10/2010 | Banerjee et al. |
| 7,843,403 | B2 | 11/2010 | Spitzer |
| 7,928,927 | B1 | 4/2011 | Krenz et al. |
| 7,949,295 | B2 | 5/2011 | Kumar et al. |
| 7,965,868 | B2 | 6/2011 | Roberts et al. |
| 8,046,719 | B2 | 10/2011 | Skourup et al. |
| 8,059,342 | B2 | 11/2011 | Burke |
| 8,320,217 | B1 | 11/2012 | Barger et al. |
| 8,625,200 | B2 | 1/2014 | Smith et al. |
| 8,678,282 | B1 | 3/2014 | Black et al. |
| 8,766,879 | B2 | 7/2014 | Fujikawa et al. |
| 8,781,794 | B2 | 7/2014 | Harrison et al. |
| 8,884,845 | B2 | 11/2014 | Yamazaki et al. |
| 8,928,558 | B2 | 1/2015 | Lewis et al. |
| 8,964,298 | B2 | 2/2015 | Haddick et al. |
| 9,384,594 | B2 | 7/2016 | Maciocci et al. |
| 9,551,873 | B2 | 1/2017 | Zalewski |
| 2001/0033401 | A1 | 10/2001 | Kasai et al. |
| 2001/0043163 | A1 | 11/2001 | Waldern et al. |
| 2002/0036649 | A1 | 3/2002 | Kim et al. |
| 2002/0047987 | A1 | 4/2002 | Massengill et al. |
| 2002/0094189 | A1 | 7/2002 | Navab et al. |
| 2002/0163486 | A1 | 11/2002 | Ronzani et al. |
| 2002/0181115 | A1 | 12/2002 | Massof et al. |
| 2002/0186179 | A1 | 12/2002 | Knowles |
| 2002/0196554 | A1 | 12/2002 | Cobb et al. |
| 2003/0184868 | A1 | 10/2003 | Geist |
| 2004/0008157 | A1 | 1/2004 | Brubaker et al. |
| 2004/0070839 | A1 | 4/2004 | Yagi et al. |
| 2004/0130783 | A1 | 7/2004 | Solomon |
| 2004/0174599 | A1 | 9/2004 | Dietrich |
| 2005/0046953 | A1 | 3/2005 | Repetto et al. |
| 2006/0072215 | A1 | 4/2006 | Nishi |
| 2006/0103590 | A1 | 5/2006 | Divon |
| 2006/0227067 | A1 | 10/2006 | Iwasaki |
| 2006/0281061 | A1 | 12/2006 | Hightower et al. |
| 2007/0020587 | A1 | 1/2007 | Seymore et al. |
| 2007/0097277 | A1 | 5/2007 | Hong et al. |
| 2007/0132785 | A1 | 6/2007 | Ebersole, Jr. et al. |
| 2007/0177275 | A1 | 8/2007 | McGuire, Jr. |
| 2007/0219760 | A1 | 9/2007 | Yang et al. |

(56) References Cited

U.S. PATENT DOCUMENTS

| | | | |
|---|---|---|---|
| 2007/0236800 A1 | 10/2007 | Cakmakci et al. |
| 2007/0242131 A1 | 10/2007 | Sanz-Pastor et al. |
| 2007/0243916 A1 | 10/2007 | Lee |
| 2007/0248283 A1 | 10/2007 | Mack et al. |
| 2007/0273983 A1* | 11/2007 | Hebert | G02B 5/1895 359/708 |
| 2008/0007181 A1 | 1/2008 | Pickering |
| 2008/0063400 A1 | 3/2008 | Hudson et al. |
| 2008/0071559 A1 | 3/2008 | Arrasvuori |
| 2008/0123049 A1 | 5/2008 | Volk |
| 2008/0130309 A1 | 6/2008 | Condon et al. |
| 2008/0198459 A1 | 8/2008 | Fergason |
| 2008/0204731 A1 | 8/2008 | Williams |
| 2008/0309586 A1 | 12/2008 | Vitale |
| 2009/0002574 A1 | 1/2009 | Sorek et al. |
| 2009/0015735 A1 | 1/2009 | Simmonds |
| 2009/0040308 A1 | 2/2009 | Temovskiy |
| 2009/0112469 A1 | 4/2009 | Lapidot et al. |
| 2009/0122385 A1 | 5/2009 | Hilton |
| 2009/0153437 A1 | 6/2009 | Aharoni |
| 2009/0173788 A1 | 7/2009 | Moraites et al. |
| 2009/0174589 A1 | 7/2009 | Moraites |
| 2009/0190003 A1 | 7/2009 | Park et al. |
| 2009/0228251 A1 | 9/2009 | Cakmakci et al. |
| 2009/0238378 A1 | 9/2009 | Kikinis et al. |
| 2010/0002154 A1 | 1/2010 | Hua |
| 2010/0018285 A1 | 1/2010 | Murphy et al. |
| 2010/0020643 A1 | 1/2010 | Barger et al. |
| 2010/0060551 A1 | 3/2010 | Sugiyama et al. |
| 2010/0103075 A1 | 4/2010 | Kalaboukis et al. |
| 2010/0103196 A1 | 4/2010 | Kumar et al. |
| 2010/0149073 A1 | 6/2010 | Chaum et al. |
| 2010/0165430 A1 | 7/2010 | Buschbeck |
| 2010/0171680 A1 | 7/2010 | Lapidot et al. |
| 2010/0175685 A1* | 7/2010 | Campbell | F24J 2/38 126/601 |
| 2010/0214635 A1 | 8/2010 | Sasaki et al. |
| 2010/0238161 A1 | 9/2010 | Varga et al. |
| 2010/0245387 A1 | 9/2010 | Bachelder et al. |
| 2010/0254001 A1 | 10/2010 | Jang |
| 2010/0277575 A1 | 11/2010 | Ismael et al. |
| 2010/0279255 A1 | 11/2010 | Williams, II |
| 2010/0321409 A1 | 12/2010 | Komori et al. |
| 2011/0018903 A1 | 1/2011 | Lapstun et al. |
| 2011/0057863 A1 | 3/2011 | Sugihara et al. |
| 2011/0130636 A1 | 6/2011 | Daniel et al. |
| 2011/0202306 A1 | 8/2011 | Eng et al. |
| 2011/0213664 A1 | 9/2011 | Osterhout et al. |
| 2011/0214082 A1 | 9/2011 | Osterhout et al. |
| 2011/0216060 A1 | 9/2011 | Weising et al. |
| 2011/0221656 A1 | 9/2011 | Haddick et al. |
| 2011/0221657 A1 | 9/2011 | Haddick et al. |
| 2011/0221658 A1 | 9/2011 | Haddick et al. |
| 2011/0221659 A1 | 9/2011 | King, III et al. |
| 2011/0221668 A1 | 9/2011 | Haddick et al. |
| 2011/0221669 A1 | 9/2011 | Shams et al. |
| 2011/0221670 A1 | 9/2011 | King, III et al. |
| 2011/0221671 A1 | 9/2011 | King, III et al. |
| 2011/0221672 A1 | 9/2011 | Osterhout et al. |
| 2011/0221793 A1 | 9/2011 | King et al. |
| 2011/0221896 A1 | 9/2011 | Haddick et al. |
| 2011/0221897 A1 | 9/2011 | Haddick et al. |
| 2011/0222745 A1 | 9/2011 | Osterhout et al. |
| 2011/0225536 A1 | 9/2011 | Shams et al. |
| 2011/0227812 A1 | 9/2011 | Haddick et al. |
| 2011/0227813 A1 | 9/2011 | Haddick et al. |
| 2011/0227820 A1 | 9/2011 | Haddick et al. |
| 2011/0228403 A1* | 9/2011 | Masuda | B60R 1/001 359/630 |
| 2011/0231757 A1 | 9/2011 | Haddick et al. |
| 2011/0250962 A1 | 10/2011 | Feiner et al. |
| 2011/0283865 A1 | 11/2011 | Collins |
| 2011/0289810 A1 | 12/2011 | D'Souza et al. |
| 2012/0050144 A1 | 3/2012 | Morlock |
| 2012/0068913 A1 | 3/2012 | Bar-Zeev et al. |
| 2012/0120498 A1 | 5/2012 | Harrison et al. |
| 2012/0120499 A1 | 5/2012 | Harrison et al. |
| 2012/0123742 A1 | 5/2012 | Harrison et al. |
| 2012/0154920 A1 | 6/2012 | Harrison et al. |
| 2012/0204307 A1 | 8/2012 | De Mattei et al. |
| 2012/0212400 A1 | 8/2012 | Border et al. |
| 2012/0242695 A1 | 9/2012 | Martin |
| 2012/0274775 A1 | 11/2012 | Reiffel |
| 2012/0326948 A1 | 12/2012 | Crocco et al. |
| 2013/0016123 A1 | 1/2013 | Skarulis |
| 2013/0021224 A1 | 1/2013 | Fujikawa et al. |
| 2013/0163090 A1 | 6/2013 | Yu |
| 2014/0002677 A1 | 1/2014 | Schinker |
| 2014/0104274 A1 | 4/2014 | Hilliges et al. |
| 2014/0152531 A1 | 6/2014 | Murray et al. |
| 2014/0182659 A1* | 7/2014 | Davis | G02B 3/08 136/246 |
| 2015/0103152 A1 | 4/2015 | Qin |
| 2015/0177516 A1 | 6/2015 | Blonde et al. |
| 2015/0178992 A1 | 6/2015 | Bhuruth |
| 2015/0260474 A1 | 9/2015 | Rublowsky et al. |
| 2016/0187969 A1 | 6/2016 | Larsen et al. |

FOREIGN PATENT DOCUMENTS

| | | |
|---|---|---|
| CN | 103261944 A | 8/2013 |
| DE | 102007009828 A1 | 9/2008 |
| EP | 1418458 A1 | 12/2004 |
| EP | 2624238 A1 | 7/2013 |
| GB | 2461907 A | 1/2010 |
| JP | 55-164801 A | 12/1980 |
| JP | 02-032301 A | 2/1990 |
| JP | 05-303054 A | 11/1993 |
| JP | H07134266 A | 5/1995 |
| JP | H07225790 A | 8/1995 |
| JP | H07244246 A | 9/1995 |
| JP | H08190072 A | 7/1996 |
| JP | 08-278476 A | 10/1996 |
| JP | 10-080575 A | 3/1998 |
| JP | 10-206786 A | 8/1998 |
| JP | 2000047138 A | 2/2000 |
| JP | 2002287077 A | 10/2002 |
| JP | 2006039359 A | 2/2006 |
| JP | 2006091477 A | 4/2006 |
| JP | 2008058461 A | 3/2008 |
| JP | 2008529064 A | 7/2008 |
| JP | 2009069364 A | 4/2009 |
| JP | 2009232133 A | 10/2009 |
| JP | 2010019874 A | 1/2010 |
| JP | 2010020065 A | 1/2010 |
| JP | 2010517090 A | 5/2010 |
| JP | 2011133633 A | 7/2011 |
| KR | 10-0292015 B1 | 3/2001 |
| TW | I244318 B | 11/2005 |
| TW | 201326895 A | 7/2013 |
| WO | 9722964 A1 | 6/1997 |
| WO | 2005017729 A2 | 2/2005 |
| WO | 2008051578 A2 | 5/2008 |
| WO | 2010047212 A1 | 5/2008 |
| WO | 2009066408 A1 | 5/2009 |
| WO | 2009094643 A2 | 7/2009 |
| WO | 2010123934 A1 | 10/2010 |
| WO | 2011114149 A1 | 9/2011 |
| WO | 2012052980 A2 | 4/2012 |
| WO | 2012052981 A2 | 4/2012 |
| WO | 2012083042 A1 | 6/2012 |

OTHER PUBLICATIONS

Second Office Action for Chinese Patent Application No. 201180067287.4, dated Oct. 10, 2015, 9 pages.

Examination Report for European Patent Application No. 11806088.8, dated Oct. 27, 2015, 3 pages.

Notification of Reason(s) for Rejection for Japanese Patent Application No. JP 2013-544784, dated Aug. 17, 2015, 3 pages.

Final Office Action for U.S. Appl. No. 13/211,365, dated Jun. 15, 2015, 23 pages.

(56) References Cited

OTHER PUBLICATIONS

Notice of Allowance for U.S. Appl. No. 13/211,365, dated Sep. 21, 2015, 7 pages.
Non-Final Office Action for U.S. Appl. No. 13/327,217, dated May 21, 2015, 12 pages.
Final Office Action for U.S. Appl. No. 13/327,217, dated Oct. 8, 2015, 15 pages.
Advisory Action for U.S. Appl. No. 13/327,217, dated Jan. 4, 2016, 3 pages.
Non-final Office Action for U.S. Appl. No. 13/211,365, dated Feb. 2, 2016, 15 pages.
Debevec, Paul, et al., "A Lighting Reproduction Approach to Live-Action Compositing," Proceedings of the 29th annual conference on Computer graphics and interactive techniques (SIGGRAPH), Jul. 21-26, 2002, San Antonio, Texas, ACM, pp. 1-10.
Decision of Final Rejection for Japanese Patent Application No. 2013-534453, dated Jul. 26, 2016, 5 pages.
Patent Examination Report No. 1 for Australian Patent Application No. 2015249168, dated Jun. 27, 2016, 3 pages.
Notification of Reasons for Rejection for Japanese Patent Application No. 2013-534454, dated Jun. 1, 2016, 13 pages.
Notification of Reasons for Rejection for Japanese Patent Application No. 2013-544784, dated May 31, 2016, 11 pages.
Non-Final Office Action for U.S. Appl. No. 14/884,975, dated Sep. 9, 2016, 30 pages.
Non-Final Office Action for U.S. Appl. No. 14/501,509, dated Jul. 15, 2016, 7 pages.
International Search Report and Written Opinion for International Patent Application No. PCT/US2016/020444, dated Jun. 14, 2016, 11 pages.
Non-Final Office Action for U.S. Appl. No. 13/303,607, dated Mar. 20, 2014, 23 pages.
Final Office Action for U.S. Appl. No. 13/303,607, dated Oct. 9, 2014, 27 pages.
Non-Final Office Action for U.S. Appl. No. 13/304,780 dated Jan. 30, 2013, 13 pages.
Final Office Action for U.S. Appl. No. 13/304,780, dated Aug. 15, 2013, 16 pages.
Notice of Allowance and Applicant-Initiated Interview Summary for U.S. Appl. No. 13/304,780, dated Nov. 8, 2013, 15 pages.
Amery, John G., et al., "Flight Simulation Visual Requirements and a New Display System," Cockpit Displays VI: Displays for Defense Applications, Proceedings of the SPIE, vol. 3690, Aug. 16, 1999, 16 pages.
Author Unknown, "ABI Research Anticipates 'Dramatic Growth' for Augmented Reality via Smartphones," Human-Machine Technology Research Service, ABI Research, Oct. 22, 2009, 1 page.
Author Unknown, "VST-2200FL Flight Simulator," VIRTUAL SimTech, 2013, http://www.virtualsimtech.com/flightsimulators.htm, 2 pages.
Author Unknown, "Head Mounted Displays from INITION," Retrieved from http://www.inition.co.uk/3D-Technologies/productsection/31, Accessed on Dec. 30, 2011, 4 pages.
Author Unknown, "Immersive Displays: Powerwall, CAVE, Headmounted Displays (HMD)," InterSense Applications, Downloaded at http://www.intersense.com/categories/11/, Accessed on Mar. 7, 2011, InterSense Incorporated, 3 pages.
Author Unknown, "Lumus—Consumer Market Products," Retrieved from http://www.lumus-optical.com/index.php?option=com_content&task=view&id=9&1temid=15, Accessed on Dec. 30, 2011, Lumus Ltd., 4 pages.
Author Unknown, "SEOS Ultra Wide Field-of-View Head Mounted Display," SEOS HMD 120/40, Product Specifications, Retrieved from http://cgsd.com/SEOSHMD/, Accessed on Oct. 31, 2013, SEOS Displays Ltd., 3 pages.
Author Unknown, "Vuzix High Resolution Video Eyewear: The Future of Big Screen Viewing on the Go!," Vuzix Products, Retrieved from http://www.vuzix.com/consumer, Retrieved Dec. 30, 2011, Vuzix, 2 pages.

Ayras et al., "Near-To-Eye Display Based on Retinal Scanning and a Diffractive Exitpupil Expander," Proceedings of SPIE—The International Society for Optical Engineering, Apr. 12-15, 2010, vol. 7723, No. 77230V, SPIE, 8 pages.
Azuma et al., "Improving Static and Dynamic Registration in an Optical See-through HMD," Computer Graphics: Proceedings of SIGGRAPH 1994, Annual Conference Series, Orlando, Florida, Jul. 24-29, 1994, pp. 197-204.
Bayer et al., "Chapter 3: Introduction to Helmet-Mounted Displays," Excerpt from Helmet-Mounted Displays: Sensation, Perception and Cognition Issues, U.S. Army Medical Department, Medical Research and Material Command, USAARL, 2009, 65 pages.
Billinghurst et al., "Collaboration with Tangible Augmented Reality Interfaces," Proceedings of the Ninth International Conference on Human-Computer Interaction, Aug. 2001, vol. 1, 5 pages.
Cakmakci et al., "Meshfree Approximation Methods for Free-Form Surface Representation in Optical Design With Applications to Head-Worn Displays," Proceedings of the SPIE, Aug. 2008, vol. 7061, SPIE, 15 pages.
Cakmakci et al., "Optical Free-Form Surfaces in Off-Axis Head-Worn Display Design," Mixed and Augmented Reality, 7th IEEE/ACM International Symposium, Mar. 2008, pp. 29-32.
Dejong, C. Dean, "Full-Color, See-Through, Daylight-Readable, Goggle-Mounted Display," Proceedings of SPIE—The International Society for Optical Engineering, Apr. 28, 2011, vol. 8041, SPIE, 13 pages.
Feiner, Steven, et al., "MARS—Mobile Augmented Reality Systems," Columbia University, Computer Graphics and User Interfaces Lab, Downloaded at http://graphics.cs.columbia.edu/projects/mars/, Accessed on Mar. 7, 2011, 4 pages.
Ferscha et al., "Wearable Displays—for Everyone!", Pervasive Computing, Jan.-Mar. 2010, vol. 9, No. 1, Institute of Electrical and Electronics Engineers Inc., pp. 7-10.
Haun, Blur, "Gartner: Mobility market will reach $1 trillion by 2014," Mobility Management News and Blogs, Visage Mobile, Oct. 21, 2010, 2 pages.
Hastings, A., "Eye Box Performance Parameters for Non Pupil Forming. Head/Helmet Mounted Displays," Tutorial, OPT 521, Dec. 6, 2006, www.optics.arizona.edu/optomech/ .. ./tutorials/HastingsTutorial1.doc, 6 pages.
Henderson, Steve, et al., "Augmented Reality for Maintenance and Repair (ARMAR)," Columbia University, Computer Graphics and User Interfaces Lab, Downloaded at http://graphics.cs.columbia.edu/projects/armar/, Jul. 2007, 4 pages.
Holden, Windsor, "A New Reality for Mobile," Whitepaper, Juniper Research Limited, Feb. 2011, 5 pages.
Hopkins et al., "Simple Thin Lens Optical Systems," US Department of Defense, Military Standardization Handbook: Optical Design, MIL-HDBK-141, Oct. 5, 1962, FSC-6650, Section 7, http://www.optics.arizona.edu/opti510I/references/mil-hdbk-141/ch7_12.pdf, 20 pages.
Jeon et al., "Mosaicing a Wide Geometric Field of View for Effective Interaction in Augmented Reality," Mixed and Augmented Reality, 6th IEEE and ACM International Symposium, Mar. 2007, pp. 265-266.
Kato et al., "Marker Tracking and HMD Calibration for a Video-based Augmented Reality Conferencing System," Proceedings of the 2nd IEEE and ACM International Workshop on Augmented Reality, Oct. 1999, San Francisco, California, 10 pages.
Kato et al., "Virtual Object Manipulation on a Table-Top AR Environment," 2000, 9 pages.
Kiyokawa, Kiyoshi, "A Wide Field-of-View Head Mounted Projective Display Using Hyperbolic Half-Silvered Mirrors," IEEE, Nov. 16, 2007, Cybermedia Center, Osaka University, Osaka, Japan.
Klepper, Sebastian, "Augmented Reality—Display Systems," Technische Universitaet Muenchen, Munich, Germany, Jul. 4, 2007, http://campar.in.tum.de/twiki/pub/Chair/TeachingSs07ArProseminar/1_Display-Systems_Klepper_Report.pdf.
Kurze et al., "Smart Glasses: An Open Environment for AR Apps," 2010 9th IEEE International Symposium on Mixed and Augmented Reality (ISMAR), Science & Technology Papers, Oct. 13-16, 2010, Seoul, South Korea, p. 313.

(56) References Cited

OTHER PUBLICATIONS

Lingley et al., "A Single-Pixel Wireless Contact Lens Display," J. Micromech. Microeng., 21 (2011) 125014 (8pp); doi:1 0.1 088/0960-1317/21/12/125014; Nov. 22, 2011, Received Jun. 9, 2011, in final form Sep. 19, 2011.

Liu et al., "An Optical See-Through Head Mounted Display with Addressable Focal Planes," IEEE Int'l Symposium on Mixed and Augmented Reality, Sep. 15-18, 2008, Cambridge, UK.

Livingston et al., "An Augmented Reality System for Military Operations in Urban Terrain," Proc of I/ITSEC '02, Orlando, FL, Dec. 2-5, 2002.

McClernon, Chris et al., "PC-Based Desktop Display versus Immersive Head-Mounted Display Flight Simulator Performance," Interservice/Industry Training, Simulation, and Education Conference (I/ITSEC), Dec. 2006, http://www.iitsecdocs.com, 7 pages.

Melzer et al., "Guidelines for HMD Design," in Helmet-Mounted Displays: Sensation, Perception and Cognition Issues, C. E. Rash et al., ed., U.S. Army Aeromedical Research Laboratory, Fort Rucker, AL, 2009, Chapter 17, http://www.usaarl.army.mil/publications/hmd_book09/files/Section%2026%20-%20Chapter17%20Guidelines%20for%20HMD%20design.pdf.

Melzer, James E., "Head-Mounted Displays," The Avionics Handbook, Cary R. Spitzer, ed., CRC Press, Boca Raton Florida, 2001, Chapter 5, http://www.davi.ws/avionics/TheAvionicsHandbook_Cap_5.pdf.

Mori et al., "A Wide-View Parallax-Free Eye-Mark Recorder with a Hyperboloidal Half-Silvered Mirror and Appearance-Based Gaze Estimation," Visualization and Computer Graphics, IEEE Transactions, Aug. 26, 2010, p. 1, vol. PP, No. 99.

Mukawa et al., "A Full Color Eyewear Display Using Holographic Planar Waveguides," IDW'08—Proceedings of the 15th International Display Workshops, Dec. 3-5, 2008, vol. 1, pp. 259-262, Inst. of Image Information and Television Engineers.

Mukawa et al., "A Full-Color Eyewear Display Using Planar Waveguides with Reflection vol. Holograms," Journal of the Society for Information Display, vol. 17, No. 3, pp. 185-193, Mar. 2009, Society for Information Display.

Nagahara et al., "Super Wide Viewer Using Catadioptric Optics," Proc. ACM Symposium on Virtual Reality Software and Technology (VRST2003), Oct. 2003, pp. 169-175, Osaka, Japan.

Nagahara et al., "Wide Field of View Catadioptrical Head-Mounted Display," Proc. of 2003 IEEE/RSJ, Intl. Conference on Intelligent Robots and Systems, Las Vegas NV, Oct. 2003, pp. 3738-3743.

Nagahara et al., "Wide Field of View Head Mounted Display for Tele-Presence with an Omnidirectional Image Sensor," Computer Vision and Pattern Recognition Workshop, Jun. 16-22, 2003, vol. 7, 6 pages.

Okuma et al., "An Augmented Reality System Using a Real-Time Vision Based Registration," Proceedings of the Fourteenth International Conference on Pattern Recognition, Aug. 16-20, 1998, p. 1226, vol. 2.

Parviz, Babak A., "Augmented Reality in a Contact Lens," IEEE Spectrum, Sep. 2009, http://spectrum.ieee.org/biomedical/bionics/augmented-reality-in-a-contact-lens/0.

Perey, Christine, et al., "Where's the Money? Mobile AR Revenue Streams," Mobile AR Summit Position Paper, Downloaded at http://www.perey.com/MobileARSummit/PEREY-Mobile%20AR-Revenue-Streams.pdf, Feb. 9, 2010, 4 pages.

Pratt, P. D., "Advanced Helmet Sight Reticle Assembly (AHRA)," Jul. 1976, p. 364, Honeywell Inc., Minneapolis Minn. Systems and Research Div.

Rolland et al., "Development of Head-Mounted Projection Displays for Distributed, Collaborative, Augmented Reality Applications," Oct. 2005, Presence, vol. 14, No. 5, pp. 528-549.

Rolland et al., "Invited Paper Head-Worn Displays—Lens Design," 48th Annual SID Symposium, Seminar, and Exhibition 2010, Display Week 2010, May 23-28, 2010, vol. 2, pp. 855-858, Society for Information Display.

Rose, Melinda, "Microdisplays: Coming Soon to an Eye Near You?", Photonics Spectra, Sep. 2008, vol. 42, No. 9, pp. 68-69, Laurin Publishing Co. Inc.

Schonlau et al., "Personal Viewer: A Wide-Field Low-Profile See-Through Eyewear Display," Proceedings of the SPIE—The International Society for Optical Engineering, Apr. 14-16, 2004, vol. 5443, No. 1, pp. 277-287, Orlando, FL, SPIE-Int. Soc. Opt. Eng.

Schwald et al., "An Augmented Reality System for Training and Assistance to Maintenance in the Industrial Context," Journal of WSCG, Feb. 3-7, 2003, vol. 11, No. 1, Plzen, Czech Republic.

Spitzer et al., "Video I/0 Interface for Wearable Computers," Proceedings of the SPIE—The International Society for Optical Engineering, vol. 3689, pp. 278-283, 1999, Conference: Helmet- and Head-Mounted Displays IV, Apr. 5-6, 1999, Orlando, FL, SPIE-Int. Soc. Opt. Eng, USA.

Hua, Hong, "Past and future of wearable augmented reality displays and their applications," SPIE Proceedings, vol. 9186, Oct. 20, 2014, SPIE, pp. 91860O-1 to 91860O-12.

Olwal, Alex, et al., "ASTOR: An Autostereoscopic Optical See-through Augmented Reality System," Proceedings of the Fourth IEEE and ACM International Symposium on Mixed and Augmented Reality, Oct. 5-8, 2005, Vienna, Austria, IEEE, pp. 24-27.

Rolland, Jannick, P., "Wide-angle, off-axis, see-through head-mounted display," Optical Engineering, vol. 39, Issue 7, Jul. 1, 2000, Society of Photo-Optical Instrumentation Engineers, pp. 1760-1767.

Notice of Allowance and Search Report for Taiwanese Patent Application No. 100148681, dated Mar. 14, 2016, 12 pages.

International Search Report and Written Opinion for PCT/US2015/055918, dated Jan. 27, 2016, 9 pages.

Takeda et al., "Design and Implementation of a Wide Field-of-View Head Mounted Projective Display," Journal of the Institute of Image Information and Television Engineers, Jun. 2009, pp. 794-800, vol. 63, No. 6, Institute of Image Information and Television Engineers, Osaka, Japan.

Takeda et al., "Poster: A Virtual Walkthrough System with a Wide Field-of-View Stereo Head Mounted Projective Display," 3D User Interfaces, IEEE Symposium, Mar. 14-15, 2009, p. 149, Lafayette, LA.

Upton et al., "Eyeglass Head-Up Display [Vibrating Fiber Optic Assembly," 1981 SID International Symposium, Digest of Papers, Apr. 28-30, 1981, vol. XII, pp. 48-49, New York, NY, SID, Los Angeles, CA.

Vanden Brook, T., "Device Helps Pinpoint Snipers: Technology Is Critical for U.S. Combat Troops," USA Today, Wednesday, Mar. 2, 2011.

von Waldkirch et al., "Spectacle-Based Design of Wearable See-Through Display for Accommodation-Free Viewing," Proceedings of the Second International Conference on Pervasive Computing, (Lecture Notes in Comput. Sci. vol. 3001 ), Apr. 18-23, 2004, pp. 106-123, Springer-Verlag, Berlin, Germany.

Wang, Robert Y. et al., "Real-time hand-tracking with a color glove," retrieved Dec. 16, 2014 from http://people.csail.mit.edu/rywang/hand/, 3 pages.

Yang et al., "Hybrid Diffractive-Refractive 67 degree-Diagonal Field of View Optical See-Through Head-Mounted Display," Institute of Modern Optics, Aug. 17, 2005, pp. 351-355, vol. 116, No. 7, Optik—Internat, Nankai University, Tianjin, China.

Yavrucuk, I. et al., "A Low Cost Flight Simulator Using Virtual Reality Tools," IEEE Aerospace and Electronics Systems Magazine, vol. 26, Issue 4, Apr. 2011, IEEE, pp. 10-14.

International Search Report for PCT/IB2011/055824 dated May 16, 2012, 4 pages.

Written Opinion of the International Searching Authority for PCT/IB2011/055824 dated May 2, 2013, 5 pages.

International Preliminary Report on Patentability for PCT/IB2011/055824 dated May 2, 2013, 7 pages.

Examination Report for Australian Patent Application No. 2011319480 dated Oct. 27, 2014, 3 pages.

Examination Report for Australian Patent Application No. 2011319481 dated Oct. 23, 2014, 3 pages.

Examination Report for Australian Patent Application No. 2011343660 dated Oct. 31, 2014, 3 pages.

(56) References Cited

OTHER PUBLICATIONS

International Search Report for PCT/IB2011/055820 dated May 21, 2012, 4 pages.
International Search Report and Written Opinion for PCT/US2011/065201 dated Mar. 7, 2012, 14 pages.
International Preliminary Report on Patentability for PCT/US2011/065201 dated Jun. 27, 2013, 11 pages.
International Search Report for PCT/IB2011/055826 dated Sep. 14, 2012, 4 pages.
International Preliminary Report on Patentability for PCT/IB2011/055826 dated May 2, 2013, 11 pages.
First Office Action for Chinese Patent Application No. 201180060659.0, dated Nov. 3, 2014, 10 pages.
First Office Action for Chinese Patent Application No. 201180060662.2, dated Nov. 2, 2014, 13 pages.
Non-final Office Action for U.S. Appl. No. 13/211,365 dated Oct. 24, 2012, 12 pages.
Final Office Action for U.S. Appl. No. 13/211,365 dated Feb. 22, 2013, 15 pages.
Non-final Office Action and Examiner-Initiated Interview Summary for U.S. Appl. No. 13/211,365 dated Jun. 14, 2013, 18 pages.
Final Office Action for U.S. Appl. No. 13/211,365 dated Oct. 18, 2013, 22 pages.
Non-final Office Action for U.S. Appl. No. 13/211,365 dated Apr. 22, 2014, 9 pages.
Notice of Allowance for U.S. Appl. No. 13/211,365, dated Aug. 8, 2014, 7 pages.
Non-Final Office Action for U.S. Appl. No. 13/211,365, dated Jan. 12, 2015, 20 pages.
Non-final Office Action for U.S. Appl. No. 13/211,372 dated Nov. 21, 2012, 9 pages.
Non-final Office Action for U.S. Appl. No. 13/211,372 dated Mar. 7, 2013, 12 pages.
Final Office Action for U.S. Appl. No. 13/211,372 dated Aug. 1, 2013, 7 pages.
Notice of Allowance for U.S. Appl. No. 13/211,372 dated Sep. 6, 2013, 8 pages.
Non-final Office Action for U.S. Appl. No. 13/211,389 dated Feb. 26, 2013, 21 pages.
Final Office Action for U.S. Appl. No. 13/211,389 dated Jul. 12, 2013, 25 pages.
Notice of Allowance and Applicant-Initiated Interview Summary for U.S. Appl. No. 13/211,389 dated Sep. 19, 2013, 10 pages.
Notice of Allowance for U.S. Appl. No. 13/211,389 dated Jan. 6, 2014, 8 pages.
Non-final Office Action for U.S. Appl. No. 13/327,217 dated Jan. 17, 2014, 14 pages.
Final Office Action for U.S. Appl. No. 13/327,217 dated Jul. 31, 2014, 13 pages.
Advisory Action for U.S. Appl. No. 13/327,217 dated Nov. 5, 2014, 3 pages.
Office Action for Mexican Patent Application No. MX/a/20131006722, dated Dec. 8, 2014, 7 pages.
Examination Report for European Patent Application No. 11815630.6, dated Nov. 20, 2015, 4 pages.
Notification of Reason(s) for Rejection for Japanese Patent Application No. 2013-534453, dated Dec. 22, 2015, 9 pages.
Patent Examination Report No. 2 for Australian Patent Application No. 2011343660, dated Oct. 22, 2015, 3 pages.
Notice of Acceptance for Australian Patent Application No. 2011319481, dated Oct. 12, 2015, 3 pages.
Second Office Action for Chinese Patent Application No. 201180060659.0, dated Jun. 30, 2015, 6 pages.
Third Office Action for Chinese Patent Application No. 201180060659.0, dated Dec. 15, 2015, 6 pages.
Notification of Reason(s) for Rejection for Japanese Patent Application No. JP 2013-534454, dated Sep. 17, 2015, 7 pages.
Office Action and Search Report for Taiwanese Patent Application No. 100148694, dated Dec. 1, 2015, 18 pages.
Second Office Action for Chinese Patent Application No. 201180060662.2, dated Jun. 10, 2015, 7 pages.
Office Action and Search Report for Taiwanese Patent Application No. 100148681, dated Oct. 5, 2015, 15 pages.
Decision of Final Rejection for Japanese Patent Application No. 2013-534454, dated Mar. 31, 2017, 11 pages.
Decision of Final Rejection for Japanese Patent Application No. 2013-544784, dated Mar. 31, 2017, 9 pages.
Notice of Allowance for U.S. Appl. No. 13/211,365, dated Mar. 28, 2017, 4 pages.
Advisory Action for U.S. Appl. No. 14/884,975, dated Apr. 21, 2017, 3 pages.
Non-Final Office Action for U.S. Appl. No. 15/058,739, dated May 23, 2017, 9 pages.
International Preliminary Report on Patentability for International Patent Application No. PCT/US2015/055918, dated Apr. 27, 2017, 6 pages.
Notice of Allowance and Examiner-Initiated Interview Summary for U.S. Appl. No. 13/327,217, dated Mar. 24, 2017, 12 pages.
Examination Report for European Patent Application No. 11815631.4, dated Apr. 13, 2016, 11 pages.
Third Office Action for Chinese Patent Application No. 201180067287.4, dated Apr. 12, 2016, 10 pages.
Final Office Action for U.S. Appl. No. 13/211,365, dated Jul. 11, 2016, 13 pages.
Non-Final Office Action for U.S. Appl. No. 13/327,217, dated Jun. 2, 2016, 18 pages.
Office Action for Mexican Patent Application No. MX/a/2013/004453, dated Oct. 12, 2016, 3 pages.
Notice of Acceptance for Australian Patent Application No. 2015249168, dated Nov. 4, 2016, 2 pages.
Office Action for Mexican Patent Application No. MX/a/2013/004454, dated Oct. 12, 2016, 3 pages.
Decision of Rejection for Chinese Patent Application No. 201180067287.4, dated Oct. 17, 2016, 14 pages.
Advisory Action for U.S. Appl. No. 13/211,365, dated Nov. 7, 2016, 3 pages.
Applicant-Initiated Interview Summary for U.S. Appl. No. 13/211,365, dated Nov. 17, 2016, 4 pages.
Notice of Allowance and Applicant-Initiated Interview Summary for U.S. Appl. No. 13/211,365, dated Nov. 23, 2016, 9 pages.
Final Office Action for U.S. Appl. No. 13/327,217, dated Nov. 30, 2016, 24 pages.
Decision to Grant a Patent for Japanese Patent Application No. 2013-534454, dated Oct. 18, 2017, 6 pages.
Notification of Reexamination for Chinese Patent Application No. 201180067287.4, dated Sep. 5, 2017, 10 pages.
Decision to Grant a Patent for Japanese Patent Application No. 2013-544784, dated Oct. 18, 2017, 6 pages.
International Preliminary Report on Patentability for International Patent Application No. PCT/US2016/020444, dated Sep. 14, 2017, 8 pages.
Non-Final Office Action for U.S. Appl. No. 14/959,444, dated Jul. 3, 2017, 9 pages.
Non-Final Office Action for U.S. Appl. No. 14/884,975, dated Jul. 12, 2017, 45 pages.
Non-Final Office Action for U.S. Appl. No. 15/142,380, dated Jun. 27, 2017, 19 pages.
Final Office Action for U.S. Appl. No. 15/058,739, dated Sep. 13, 2017, 16 pages.
Notification of Reason for Rejection for Japanese Patent Application No. 2016-229136, dated Oct. 30, 2017, 5 pages.
Office Action for Canadian Patent Application No. 2,815,461, dated Oct. 26, 2017, 4 pages.
Office Action for Canadian Patent Application No. 2,821,401, dated Oct. 17, 2017, 4 pages.
Office Action for Korean Patent Application No. 10-2013-701735, dated Oct. 30, 2017, 10 pages.
Office Action for Canadian Patent Application No. 2,815,452, dated Oct. 31, 2017, 4 pages.
Office Action for Korean Patent Application No. 10-2013-7013039, dated Dec. 18, 2017, 9 pages.

(56) References Cited

OTHER PUBLICATIONS

Examination Report for European Patent Application No. 11815630.6, dated Dec. 13, 2017, 6 pages.
Final Office Action for U.S. Appl. No. 14/884,975, dated Dec. 11, 2017, 45 pages.
Notice of Allowance for U.S. Appl. No. 15/058,739, dated Nov. 30, 2017, 8 pages.
Corrected Notice of Allowance for U.S. Appl. No. 15/058,739, dated Dec. 7, 2017, 5 pages.
Final Office Action for U.S. Appl. No. 15/142,380, dated Nov. 3, 2017, 27 pages.
Decision to Grant a Patent for Japanese Patent Application No. 2016-229136, dated May 8, 2018, 6 pages.
Examination Report for Indian Patent Application No. 1121/MUMNP/2013, dated Apr. 26, 2018, 7 pages.
Grant of Patent for Korean Patent Application No. 10-2013-7017315, dated Apr. 26, 2018, 5 pages.
International Preliminary Report on Patentability for International Patent Application No. PCT/US2016/057731, dated May 3, 2018, 9 pages.
Examination Report for Indian Patent Application No. 957/MUMNP/2013, dated Jun. 6, 2018, 5 pages.
Decision of Reexamination for Chinese Patent Application No. 201180067287.4, dated Feb. 11, 2018, 23 pages.
First Office Action for Korean Patent Application No. 10-2013-7013038, dated Mar. 5, 2018, 9 pages.
Examiner's Answer for U.S. Appl. No. 14/884,975, mailed Jul. 18, 2018, 23 pages.
First Examination Report for Indian Patent Application No. 959/MUMNP/2013, dated Jul. 31, 2018, 6 pages.
Notice of Final Rejection for Korean Patent Application No. 10-2013-7013039, dated Jul. 20, 2018, 5 pages.
Examination Report for European Patent Application No. 11815631.4, dated Jun. 11, 2018, 6 pages.
Grant of Patent for Korean Patent Application No. 10-2013-7013038, dated Aug. 22, 2018, 3 pages.
Final Office Action for U.S. Appl. No. No. 14/959,444, dated Jan. 16, 2018, 11 pages.
Notice of Allowance for U.S. Appl. No. 15/142,380, dated Feb. 7, 2018, 5 pages.
Advisory Action for U.S. Appl. No. 14/884,975, dated Feb. 23, 2018, 3 pages.
Non-Final Office Action for U.S. Appl. No. 14/887,800, dated Apr. 4, 2018, 18 pages.
Advisory Action for U.S. Appl. No. 14/959,444, dated Apr. 18, 2018, 5 pages.
Non-Final Office Action for U.S. Appl. No. 14/959,444, dated Jul. 3, 2018, 15 pages.
Grant of Patent for Korean Patent Application No. 10-2013-7013039, mailed Sep. 5, 2018, 2 pages.
Second Office Action for Mexican Patent Application No. MX/a/2013/004453, dated Jan. 19, 2017, 6 pages.
International Preliminary Report on Patentability for International Patent Application No. PCT/IB2011/055820, dated May 2, 2013, 8 pages.
Examination Report for European Patent Application No. 11806088.8, dated Dec. 7, 2016, 5 pages.
Final Office Action for U.S. Appl. No. 14/884,975, dated Feb. 8, 2017, 36 pages.
International Search Report for International Patent Application No. PCT/US2016/057731, dated Dec. 19, 2016, 12 pages.
Office Action for Taiwanese Patent Application No. 104134259, dated Jan. 16, 2019, 9 pages.
Quayle Action for U.S. Appl. No. 14/959,444, dated Feb. 5, 2019, 5 pages.
Advisory Action, Examiner-Initiated Interview Summary, and AFCP 2.0 Decision for U.S. Appl. No. 14/887,800, dated Mar. 19, 2019, 5 pages.

* cited by examiner

FRESNEL LENS WITH REDUCED DRAFT FACET VISIBILITY

CROSS REFERENCE TO RELATED APPLICATIONS

This application is a continuation-in-part of co-pending U.S. patent application Ser. No. 13/211,365 filed Aug. 17, 2011, entitled HEAD-MOUNTED DISPLAY APPARATUS EMPLOYING ONE OR MORE FRESNEL LENSES, which claims the benefit of and priority to U.S. Provisional Patent Application No. 61/405,440, filed Oct. 21, 2010, and entitled HEAD-MOUNTED DISPLAY; U.S. Provisional Patent Application No. 61/417,325, filed Nov. 26, 2010, and entitled CURVED-STACKED FRESNEL ARCHITECTURE; U.S. Provisional Patent Application No. 61/417,326, filed Nov. 26, 2010, and entitled CURVED-BEAM SPLITTER ARCHITECTURE; U.S. Provisional Patent Application No. 61/417,327, filed Nov. 26, 2010, and entitled COMBINED ARCHITECTURE OF FRESNEL LENSE AND FLAT BEAM SPLITTER; U.S. Provisional Patent Application No. 61/417,328, filed Nov. 26, 2010, and entitled COMBINED ARCHITECTURE OF FRESNEL LENSE AND CURVED BEAM SPLITTER; and U.S. Provisional Patent Application No. 61/427,530, filed Dec. 28, 2010, and entitled CURVED MIRROR FOR HEAD MOUNTED DISPLAY. The disclosures of each of the aforementioned patent applications are hereby incorporated herein by reference in their entireties.

TECHNICAL FIELD

The embodiments relate to a Fresnel lens and devices that use a Fresnel lens, and in particular to a Fresnel lens that has reduced draft facet visibility.

BACKGROUND

Fresnel lenses are sometimes used in virtual reality headgear. Fresnel lenses are typically planar lenses that have a grooved surface. The grooved surface includes a plurality of concentric sloped facets and a plurality of concentric draft facets. Pairs of the sloped facets and draft facets form the grooved surface. Conventionally, the draft facets are all parallel with an axis of symmetry of the lens. In other words, if the lens is oriented vertically, the draft facets are horizontal and parallel to one another. When used in virtual reality headgear, the lenses themselves are typically not in focus due to the proximity of the lenses to the user's eyes. However, the concentric draft facets create subtle but visible rings that are perceivable to a user, especially in the periphery of the lenses. Such rings can interfere with otherwise detailed imagery being viewed through the lenses and are thus undesirable to the user.

SUMMARY

The embodiments relates to Fresnel lenses and devices that utilize Fresnel lenses. The Fresnel lens includes draft facets that are angled such that the facets are not visible to a user or are at least substantially less visible to a user than conventional Fresnel lenses. The Fresnel lenses may be used, for example, in a head-mountable apparatus for use, for example, in viewing virtual reality imagery.

In one embodiment, a curved Fresnel lens is provided. The Fresnel lens includes a grooved surface and a smooth surface. The grooved surface includes a plurality of concentric sloped facets and a plurality of concentric draft facets. Pairs of concentric draft facets and concentric sloped facets form a plurality of concentric grooves in the grooved surface. The concentric sloped facets are configured to focus light toward an eye of a nominal user. At least some of the concentric draft facets are congruent with conical surfaces of respective imaginary light cones that have corresponding vertices that originate from respective focal points, wherein each imaginary light cone extends through the Fresnel lens at an angle based in part on an index of refraction of the Fresnel lens and extends beyond the grooved surface into free space.

In one embodiment, the grooved surface is a grooved convex surface, and the smooth surface is a smooth concave surface. In another embodiment, the grooved surface is a grooved concave surface, and the smooth surface is a smooth convex surface.

In another embodiment, a Fresnel lens is provided that includes a grooved surface and a smooth surface. The grooved surface includes a plurality of concentric sloped facets and a plurality of concentric draft facets. Pairs of concentric draft facets and concentric sloped facets form a plurality of concentric grooves in the grooved surface. The concentric sloped facets are configured to focus light toward an eye of a nominal user. Each concentric draft facet of the plurality of concentric draft facets is non-parallel with each other concentric draft facet.

In another embodiment, a Fresnel lens includes a grooved convex exterior surface and a smooth concave interior surface. The grooved convex exterior surface includes a plurality of concentric sloped facets and a plurality of concentric draft facets. Pairs of concentric draft facets and concentric sloped facets form a plurality of concentric grooves in the grooved convex exterior surface. The concentric sloped facets are configured to focus light toward an eye of a nominal user. The Fresnel lens includes an axis of symmetry about which the Fresnel lens is symmetric, wherein at least two of the concentric sloped facets are non-parallel with respect to the axis of symmetry.

In yet another embodiment, a head-mountable apparatus is provided. The head-mountable apparatus includes a first pair of Fresnel lenses, each Fresnel lens being curved. Each Fresnel lens includes a grooved surface and a smooth surface. The grooved surface comprises a plurality of concentric sloped facets and a plurality of concentric draft facets. Pairs of concentric draft facets and concentric sloped facets form a plurality of concentric grooves in the grooved surface. The concentric sloped facets are configured to focus light toward an eye of a nominal user. At least some of the concentric draft facets are aligned with conical surfaces of respective imaginary light cones that have corresponding vertices that originate from respective focal points, wherein each imaginary light cone extends through each Fresnel lens at an index of refraction of the Fresnel lens and extends beyond the grooved surface into free space.

In one embodiment, the head-mountable apparatus includes a second pair of Fresnel lenses. Each of a pair of lens-holding structures is configured to hold a respective Fresnel lens of the first pair of Fresnel lenses and a respective Fresnel lens of the second pair of Fresnel lenses.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The use herein of ordinals in conjunction with an element is solely for distinguishing what might otherwise be similar or identical labels, such as "first lens" and "second lens," and does not imply a priority, a type, an importance, or other attribute, unless otherwise stated herein. The term "about" used herein in conjunction with a numeric value means any value that is within a range of ten percent greater than or ten percent less than the numeric value.

The embodiments relate to Fresnel lenses and devices that utilize Fresnel lens. The Fresnel lenses include draft facets that are angled such that the facets are not visible to a user, or are at least substantially less visible to a user than conventional Fresnel lenses. The Fresnel lenses may be used, for example, in a head-mountable apparatus for use in viewing virtual reality imagery.

Figure 1:
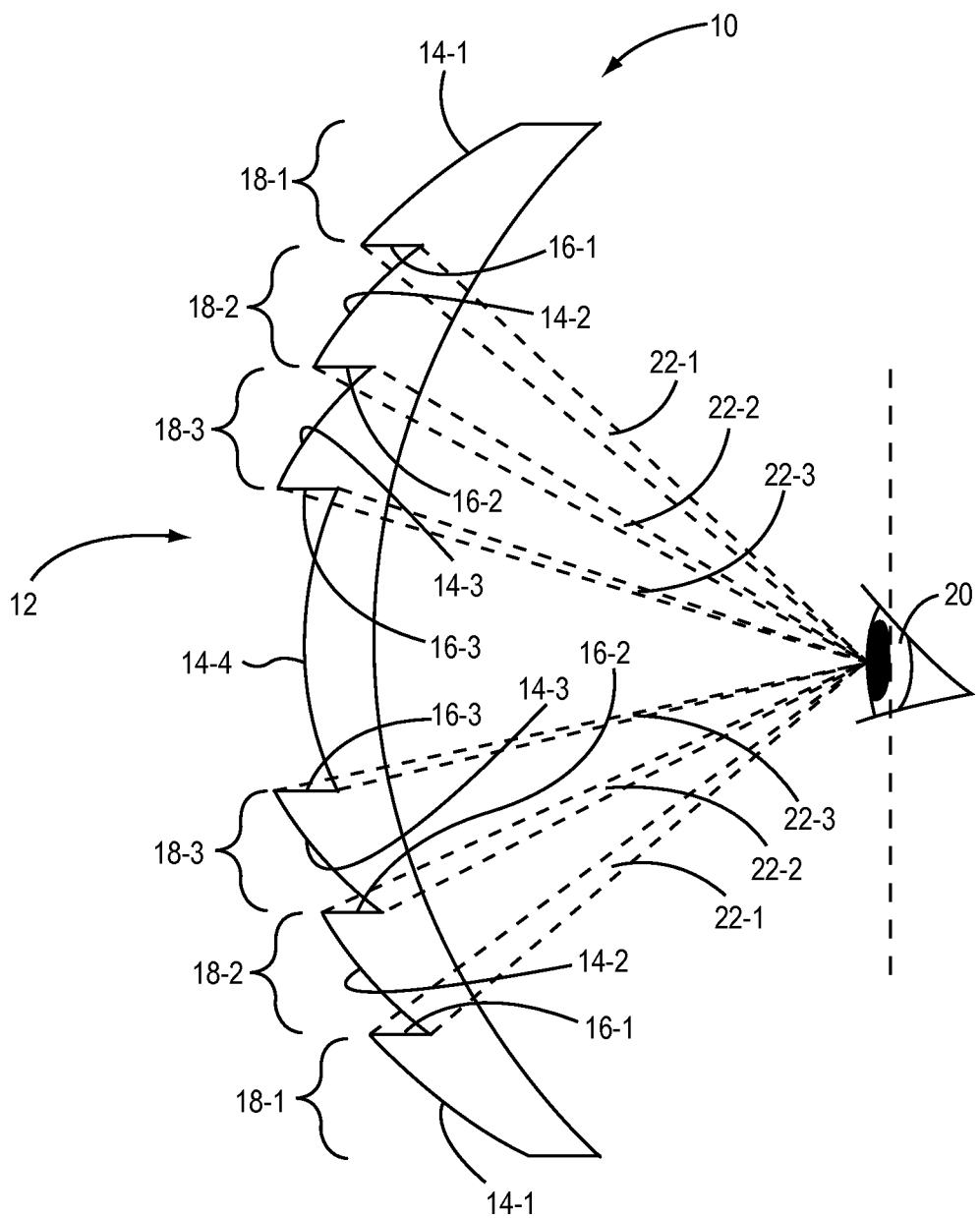
FIG. 1 is a diagram of a profile of a Fresnel lens that contains a plurality of visible draft facets.

FIG. 1 is a diagram of a profile of a Fresnel lens 10 (referred to hereinafter as the lens 10 for purposes of brevity) that contains a plurality of visible draft facets. The lens 10 is curved in one or two dimensions. In some embodiments, the lens 10 is a portion of a sphere. The lens 10 includes a grooved surface 12, comprising a plurality of concentric sloped facets 14-1-14-3 (generally, sloped facets 14) and a plurality of concentric draft facets 16-1-16-3 (generally, draft facets 16). Pairs 18-1-18-3 of sloped facets 14 and draft facets 16 form a plurality of grooves in the grooved surface 12. While for purposes of illustration only three grooves are illustrated in the grooved surface 12, the lens 10 may have any number of concentric sloped facets 14 and corresponding concentric draft facets 16 and thus may have any number of grooves.

The draft facets 16 are generally horizontal and, due to refraction of light entering the lens 10, the draft facets 16 are visible to an eye 20 as illustrated by draft facet zones 22-1-22-3. For example, if the lens 10 is used in an application wherein imagery is being focused by the lens 10 on the eye 20, the draft facets 16 cause visible rings in the imagery, degrading the quality of the imagery.

Figure 2:
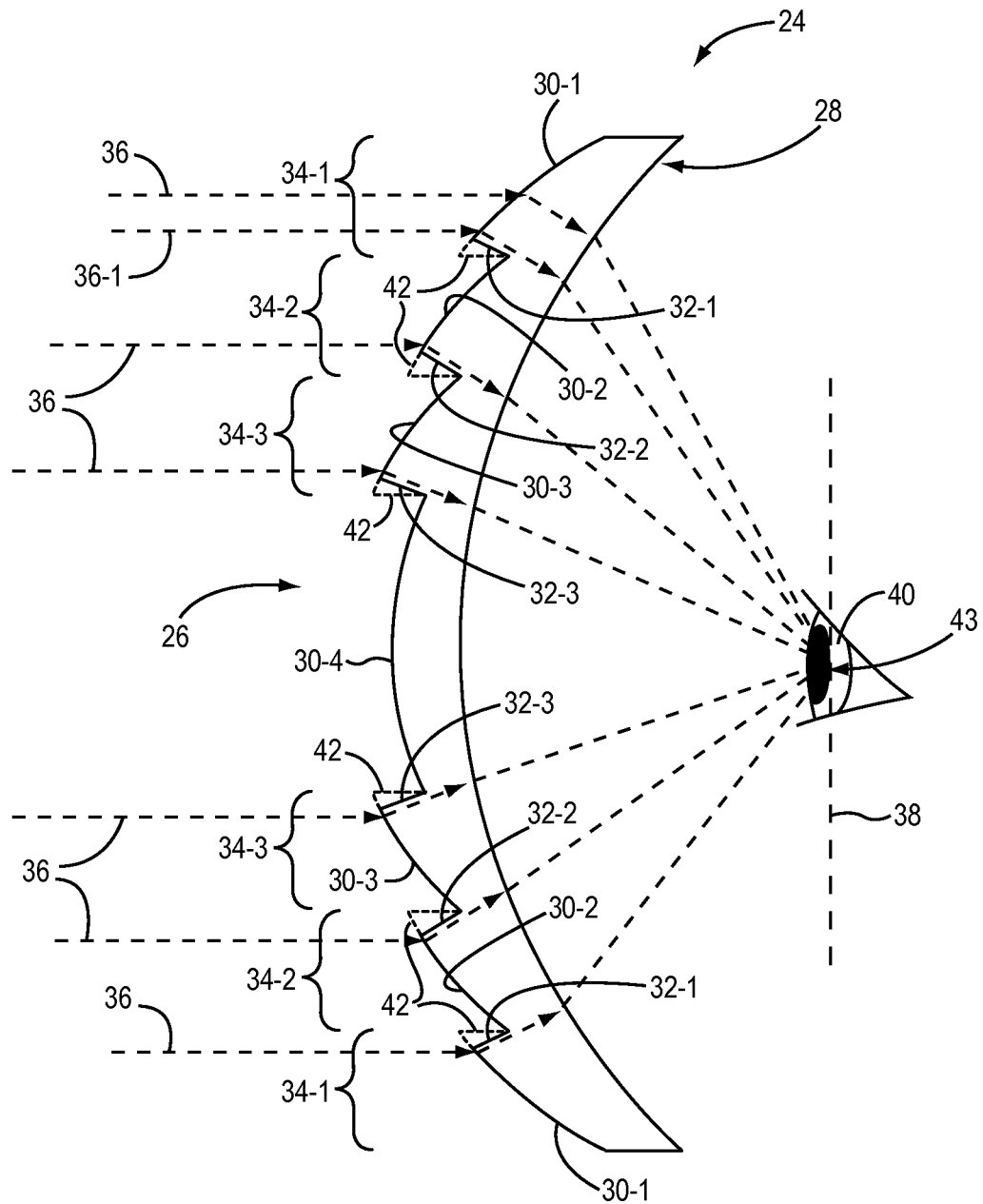
FIG. 2 is a diagram of a profile of a Fresnel lens with reduced draft facet visibility according to one embodiment.

FIG. 2 is a diagram of a profile of a Fresnel lens 24 (hereinafter "lens 24" for purposes of brevity) with reduced draft facet visibility according to one embodiment. The lens 24 is curved in one or two dimensions. In some embodiments, the lens 24 is a portion of a sphere. The lens 24 includes a grooved surface 26, which in this example is a grooved convex surface. The lens 24 also includes a smooth surface 28, which in this example is a smooth concave surface. The grooved surface 26 comprises a plurality of concentric sloped facets 30-1-30-4 (generally, sloped facets 30) and a plurality of concentric draft facets 32-1-32-3 (generally, draft facets 32). Pairs 34-1-34-3 of sloped facets 30 and draft facets 32 form a plurality of grooves in the grooved surface 26. Again, while for purposes of illustration only three grooves are illustrated in the grooved surface 26, the lens 24 may have any number of sloped facets 30 and corresponding draft facets 32 and thus may have any number of grooves. The sloped facets 30 are configured to focus light rays 36-1, 36 toward an eye 40 of a nominal user. In some embodiments, the sloped facets 30 are configured to focus the light rays 36-1, 36 toward a focal plane 38. The pairs 34-1-34-3 of sloped facets 30 and draft facets 32 may have widths that differ from one another. Forming the grooved surface 26 on the convex surface may simplify generating the Fresnel lens 24 during an injection-molding process, wherein the Fresnel lens 24 can be relatively easily pulled from the mold. Moreover, the smooth surface 28 may facilitate cleaning the Fresnel lens 24.

The draft facets 32 are not horizontal, as illustrated by dashed outlines 42, which illustrate how the draft facets 32 would normally be oriented prior to the embodiments herein. Rather, each draft facet 32 is angled based in part on the refractive index of the material of the lens 24 to reduce draft facet visibility to the eye 40 and eliminate or substantially reduce rings in imagery transmitted by the lens 24 to the eye 40. Thus, the draft facets 32 are oriented to remove ring artifacts caused by external or internal light.

In one embodiment, the draft facets 32 are congruent with conical surfaces of respective imaginary light cones that have corresponding vertices that originate from respective focal points. In this example, the respective focal points are at a common location 43 at the focal plane 38. However, in other embodiments, the vertices may originate from different focal points, and the focal points need not be on the same plane. Each imaginary light cone extends through the lens 24 at an angle based in part on the index of refraction of the lens 24 and extends beyond the grooved surface 26 into free space. This is illustrated, for example, by the light ray 36-1, wherein the light ray 36-1 is incident on the sloped facet 30-1 and which then, based on the angle of incidence of the light ray 36-1 with respect to the sloped facet 30-1 and the index of refraction of the lens 24, travels at a different angle through the lens 24. As the light ray 36-1 exits the smooth surface 28 and enters the free space between the smooth surface 28 and the eye 40, the angle of the light ray 36-1 changes again and travels to the vertex 43. Note that the draft facet 32-1 is parallel to the light ray 36-1, thus being essentially invisible to the eye 40, or at least substantially less visible to the eye 40 than the draft facets 16 illustrated in FIG. 1.

Forming the grooves on the grooved surface 26, as opposed to the smooth surface 28, facilitates production of the lens 24 using relatively conventional injection molding techniques, such that the injection molds can be easily released from the lens 24 after the lens 24 has hardened or otherwise cured. The lens 24 may comprise any suitable material, such as, by way of non-limiting example, acrylic.

Figure 3:
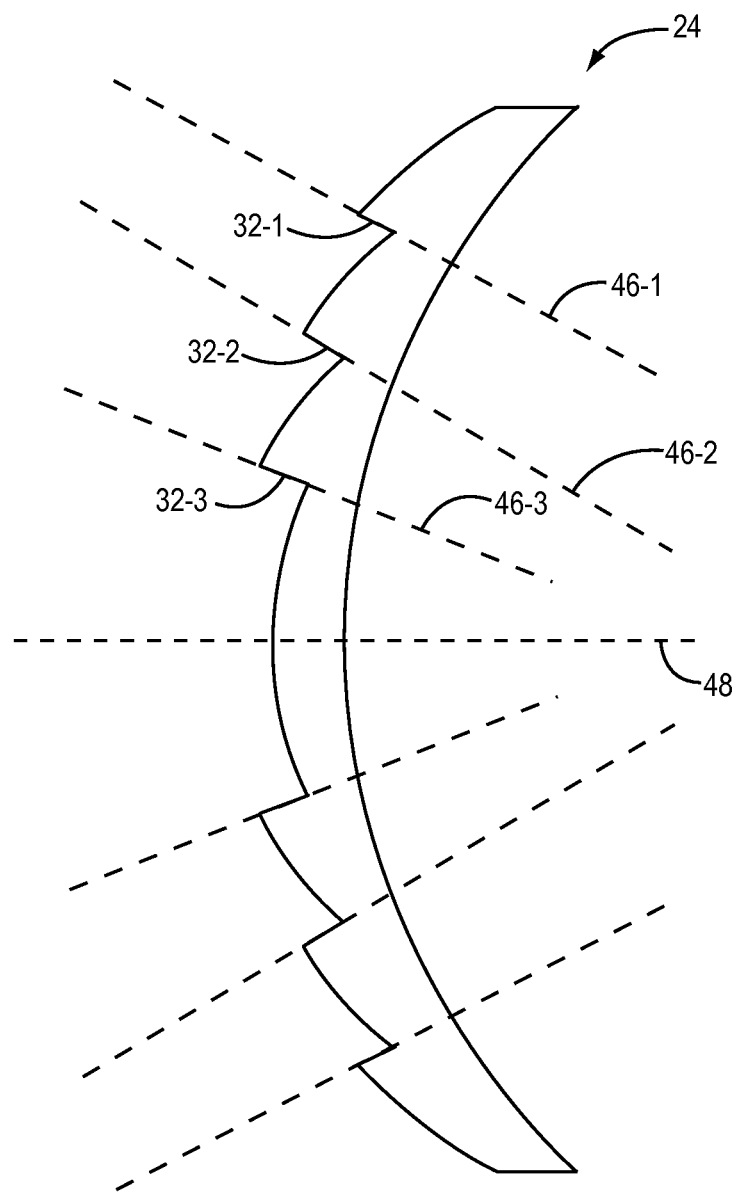
FIG. 3 is a diagram of a profile of the Fresnel lens illustrated in FIG. 2 illustrating additional aspects of the Fresnel lens according to one embodiment.

FIG. 3 is a diagram of the profile of the lens 24 illustrated in FIG. 2. In some embodiments, each draft facet 32 is non-parallel with each other draft facet 32. Thus, lines 46-1-46-3, each of which is collinear with respective draft facets 32-1-32-3, are non-parallel. The lens 24 is symmetrical about an axis of symmetry 48. The draft facets 32 are also non-parallel to the axis of symmetry 48.

Figure 4:
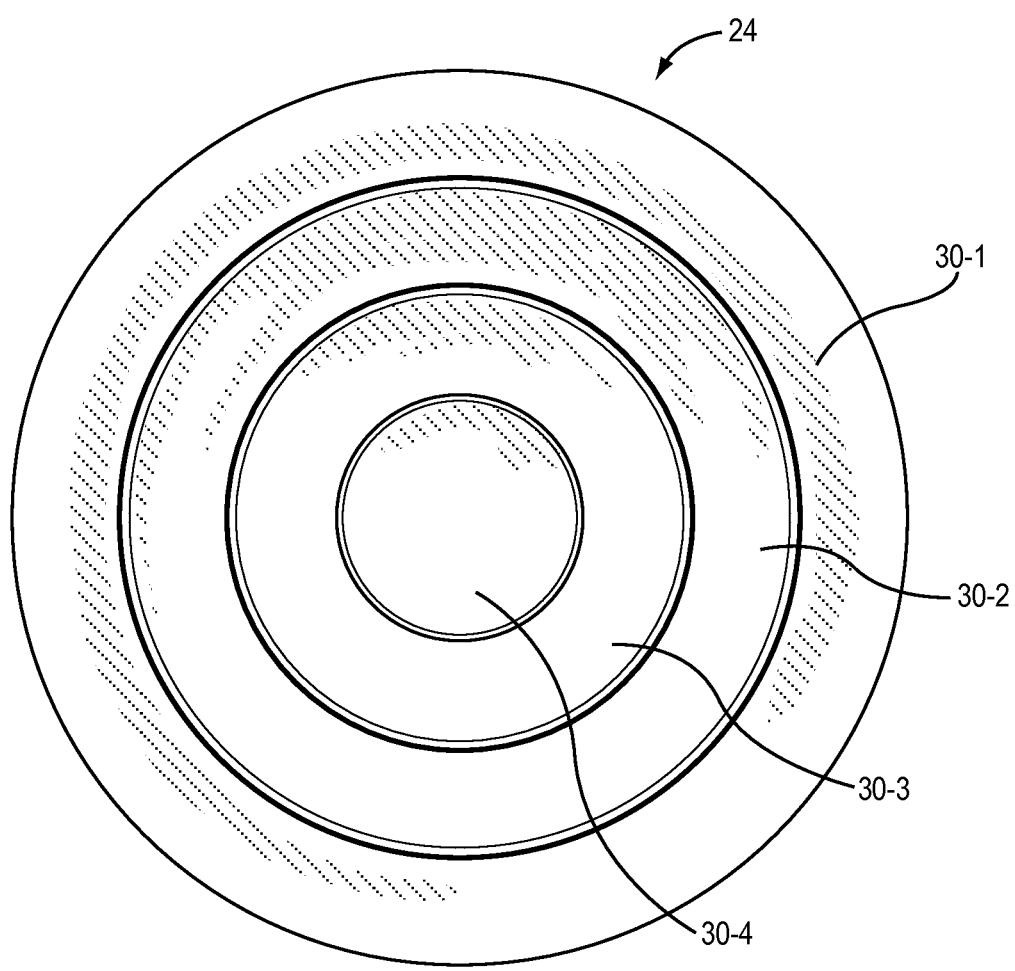
FIG. 4 is a front view of the Fresnel lens illustrated in FIGS. 2 and 3 according to one embodiment.

FIG. 4 is a front view of the lens 24 according to one embodiment.

Figure 5:
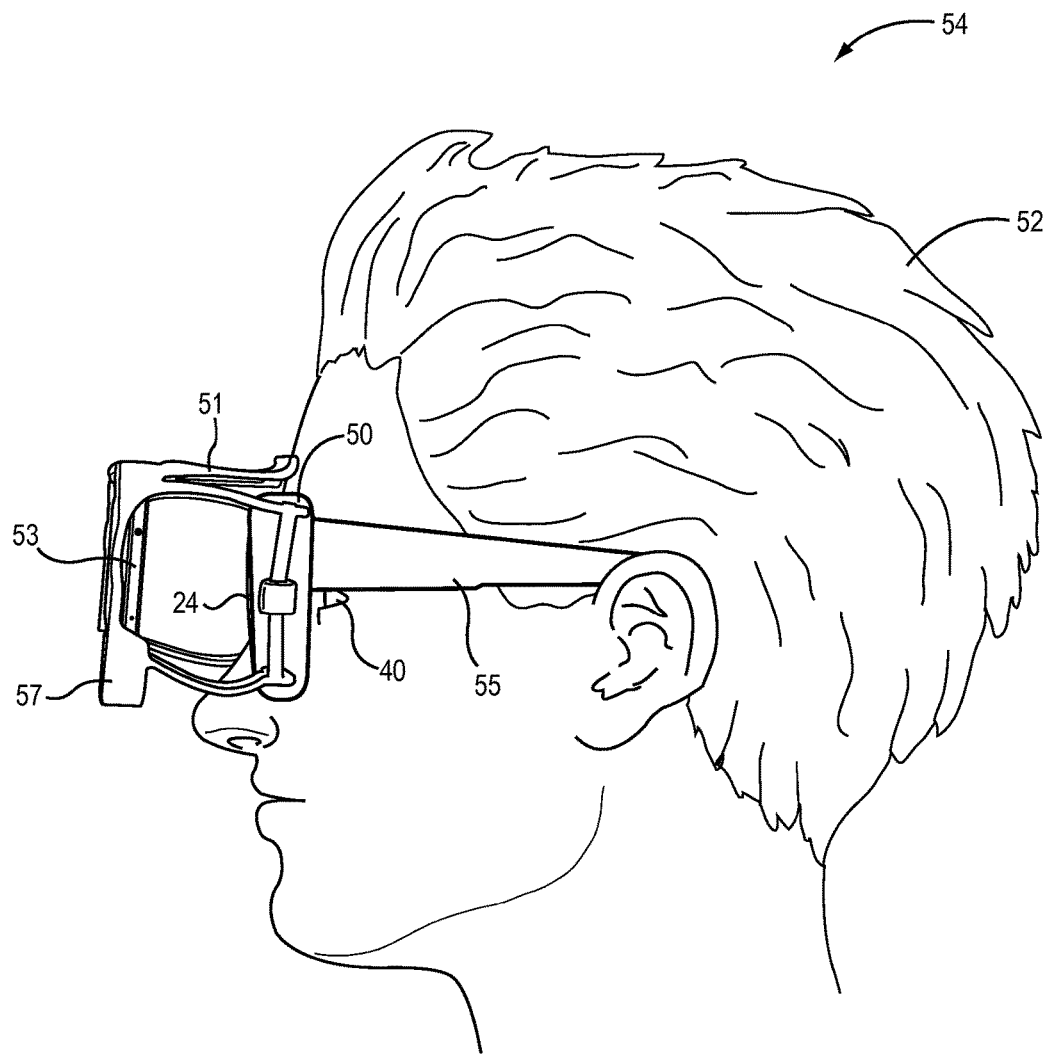
FIG. 5 is a side view of a head-mountable apparatus incorporating a pair of Fresnel lenses according to one embodiment.

FIG. 5 is a side view of a head-mountable apparatus 50 incorporating a pair of Fresnel lenses 24, according to one embodiment. In this example, the head-mountable apparatus 50 mounts to a head 52 of a user 54 via a pair of temples 55. In other embodiments, the head-mountable apparatus 50 may mount to the head 52 via a strap or straps (not illustrated), or by attachment to another device, such as a hat or cap (not illustrated) via clips 51. Generally, the Fresnel lenses 24 are positioned such that imagery provided by a display system 53, in this example a smartphone, supported by a structure 57, is focused on respective eyes 40 (only one illustrated) of the user 54. The structure 57 may comprise any suitable material, including, by way of non-limiting example, plastic or other polymer, aluminum or other metal, or a composite material. The structure 57 maintains the smartphone at a predetermined distance from the Fresnel lenses 24.

Figure 6:
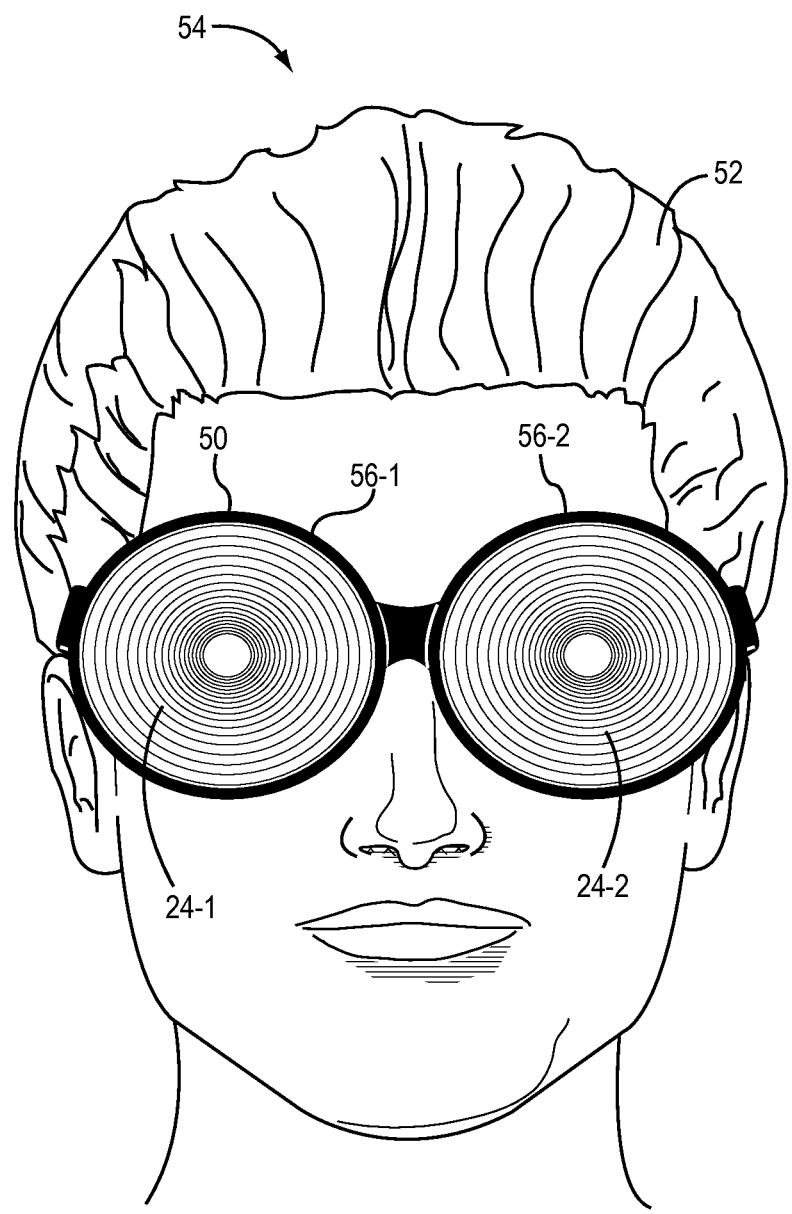
FIG. 6 is a front view of the head-mountable apparatus illustrated in FIG. 5.

FIG. 6 is a front view of the head-mountable apparatus 50 illustrated in FIG. 5, with the structure 55 and the display system 53 omitted for purposes of clarity. The head-mountable apparatus 50 includes two lens-holding structures 56-1, 56-2, each of which holds a Fresnel lens 24-1, 24-2, respectively.

Figure 7:
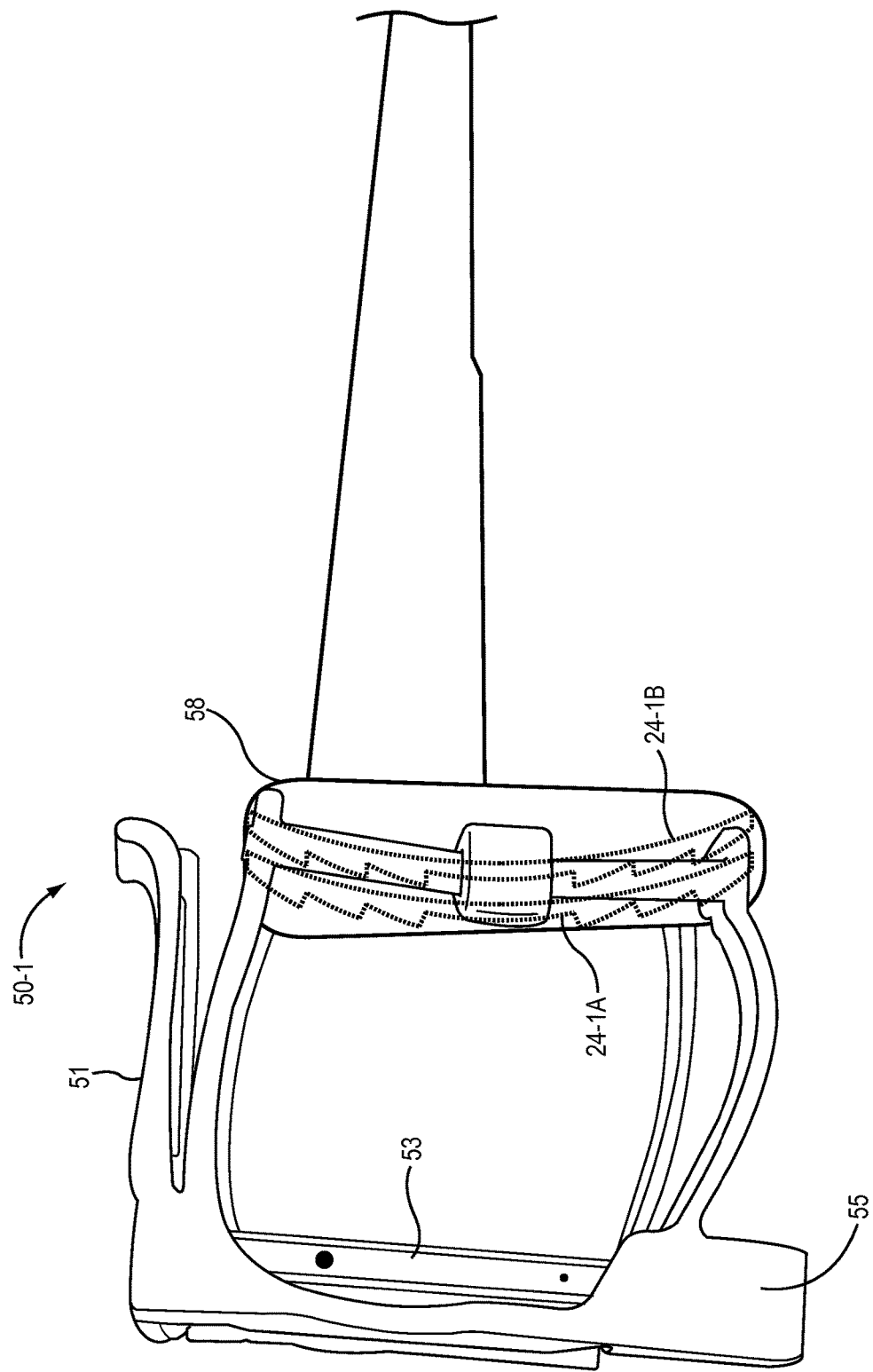
FIG. 7 is a side view of a head-mountable apparatus according to another embodiment.

FIG. 7 is a side view of a head-mountable apparatus 50-1 according to another embodiment. In this embodiment, a pair of lens-holding structures 58 (only one illustrated) holds a pair of Fresnel lenses 24-1A, 24-1B in a stacked relationship, such that light travels through both of the Fresnel lenses 24-1A, 24-1B on the way to an eye of the user. In some embodiments, three or more Fresnel lenses 24-1 may be arranged in a stacked relationship in the pair of lens-holding structures 58. Both of the Fresnel lenses 24-1A, 24-1B may comprise draft facets that are angled such that the draft facets are not visible to the user, or, as illustrated in FIG. 7, in some embodiments only the front Fresnel lenses 24-1A comprise draft facets that are angled such that the draft facets are not visible to the user, and the rear Fresnel lenses 24-1B may comprise Fresnel lenses with horizontal draft facets. However, it should be noted that the cost of a one-lens solution is less than the cost of a two-lens solution.

Figure 8:
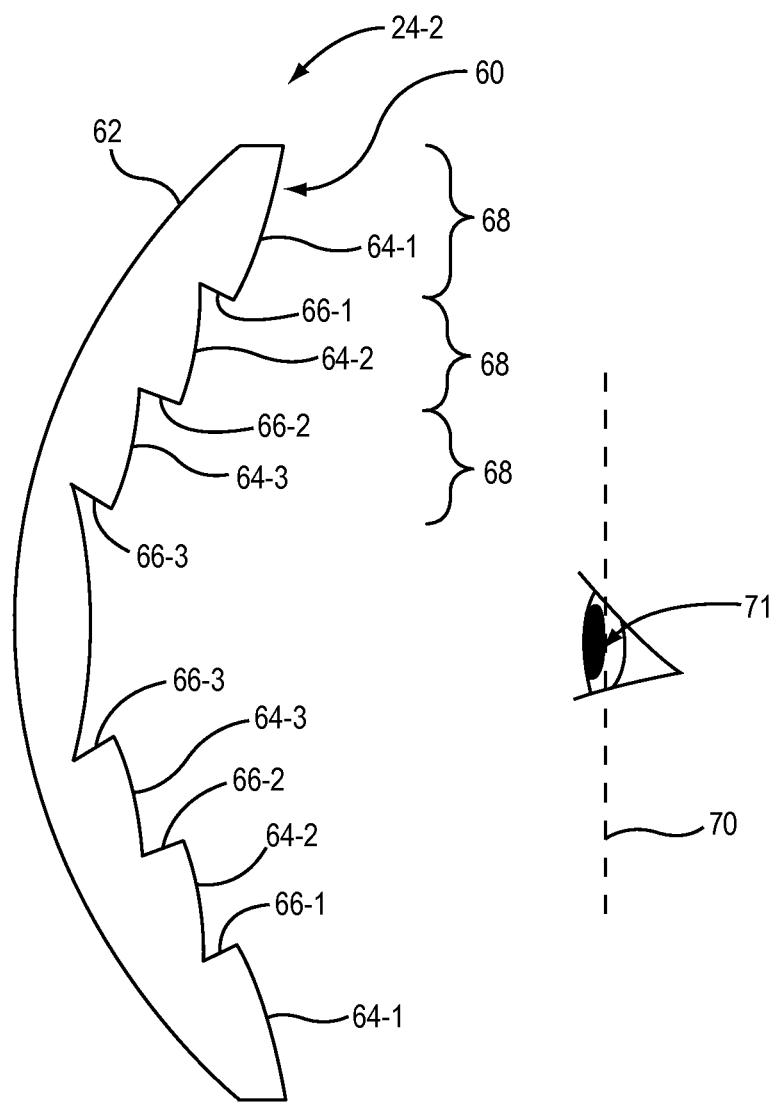
FIG. 8 is a profile of a Fresnel lens according to another embodiment.

FIG. 8 is a profile of a Fresnel lens 24-2 according to another embodiment. In this embodiment, the Fresnel lens 24-2 includes a grooved concave surface 60 and a smooth convex surface 62. The grooved concave surface 60 includes a plurality of concentric sloped facets 64-1-64-3 (generally, sloped facets 64) and a plurality of concentric draft facets 66-1-66-3 (generally, draft facets 66). Pairs of draft facets 66 and sloped facets 64 form a plurality of concentric grooves 68 in the grooved concave surface 60. The sloped facets 64 are configured to focus light toward an eye 71 of a nominal user. At least some of the draft facets 66 are congruent with conical surfaces of respective imaginary light cones that have a common vertex 72 at the focal plane, wherein each imaginary light cone extends through the Fresnel lens 24-2 at an angle based in part on an index of refraction of the Fresnel lens 24-2 and extends beyond the smooth convex surface 62 into free space. In some embodiments, each draft facet 66 is non-parallel with each other draft facet 66. In some embodiments, the conical surfaces of the respective imaginary light cones have corresponding vertices that originate from respective focal points that are not at a same location.

Figure 9:
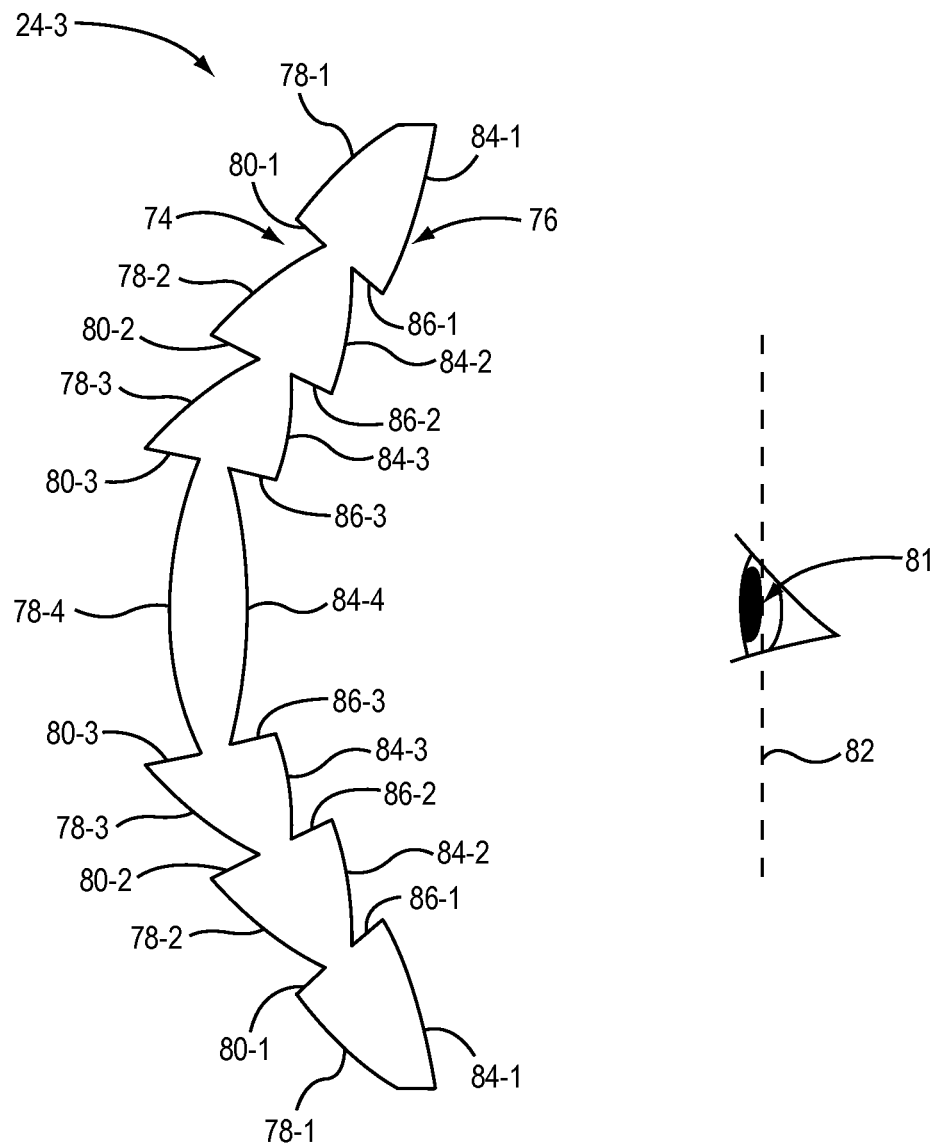
FIG. 9 is a profile of a Fresnel lens according to another embodiment.

FIG. 9 is a profile of a Fresnel lens 24-3 according to another embodiment. In this embodiment, the Fresnel lens 24-3 includes a grooved convex surface 74 and a grooved concave surface 76. The grooved convex surface 74 includes a plurality of concentric sloped facets 78-1-78-4 (generally, sloped facets 78) and a plurality of concentric draft facets 80-1-80-3 (generally, draft facets 80). Pairs of draft facets 80 and sloped facets 78 form a plurality of concentric grooves in the grooved convex surface 74. The sloped facets 78 are configured to focus light toward an eye 81 of a nominal user. In some embodiments, the sloped facets 78 are configured to focus light toward a focal plane 82. At least some of the draft facets 80 are congruent with conical surfaces of respective imaginary light cones that have a common vertex at the focal plane 82, wherein each imaginary light cone extends through the Fresnel lens 24-3 at an angle based in part on an index of refraction of the Fresnel lens 24-3 and extends beyond the grooved convex surface 74 into free space. In some embodiments, each draft facet 80 is non-parallel with each other draft facet 80. In some embodiments, the conical surfaces of the respective imaginary light cones have corresponding vertices that originate from respective focal points that are not at a same location.

The grooved concave surface 76 includes a plurality of concentric sloped facets 84-1-84-4 (generally, sloped facets 84) and a plurality of concentric draft facets 86-1-86-3 (generally, draft facets 86). Pairs of draft facets 86 and sloped facets 84 form a plurality of concentric grooves in the grooved concave surface 76. The sloped facets 84 are configured to focus light toward the eye 81. In some embodiments, the sloped facets 84 are configured to focus light toward the focal plane 82. At least some of the draft facets 86 are congruent with conical surfaces of respective imaginary light cones that have a common vertex at the focal plane 82, wherein each imaginary light cone extends through the Fresnel lens 24-3 at an angle based in part on an index of refraction of the Fresnel lens 24-3 and extends beyond the grooved concave surface 76 into free space. In some embodiments, each draft facet 86 is non-parallel with each other draft facet 86. In some embodiments, the conical surfaces of the respective imaginary light cones have corresponding vertices that originate from respective focal points that are not at a same location.

Those skilled in the art will recognize improvements and modifications to the preferred embodiments of the disclosure. All such improvements and modifications are considered within the scope of the concepts disclosed herein and the claims that follow.

What is claimed is:

1. A curved Fresnel lens comprising:
   a grooved surface and a smooth surface, the grooved surface comprising a plurality of concentric sloped facets and a plurality of concentric draft facets, pairs of concentric draft facets and concentric sloped facets forming a plurality of concentric grooves in the grooved surface, the plurality of concentric sloped facets configured to focus light received from the grooved surface through the smooth surface toward an eye of a nominal user;

at least some of the plurality of concentric draft facets being angled based in part on an index of refraction of the Fresnel lens to be congruent with conical surfaces of respective light cones that have corresponding vertices that originate from respective focal points, wherein each respective light cone extends through the Fresnel lens at an angle based in part on the index of refraction of the Fresnel lens and extends beyond the grooved surface into free space.

2. The curved Fresnel lens of claim 1 wherein the grooved surface is a grooved convex surface, and the smooth surface is a smooth concave surface.

3. A Fresnel lens comprising:

a grooved surface and a smooth surface, the grooved surface comprising a plurality of concentric sloped facets and a plurality of concentric draft facets, pairs of concentric draft facets and concentric sloped facets forming a plurality of concentric grooves in the grooved surface, the plurality of concentric sloped facets configured to focus light received from the grooved surface to the smooth surface toward an eye of a nominal user;

wherein each concentric draft facet of the plurality of concentric draft facets is non-parallel with each other concentric draft facet.

4. The Fresnel lens of claim 3 wherein the grooved surface is a grooved convex surface, and the smooth surface is a smooth concave surface.

5. The Fresnel lens of claim 3 wherein each concentric draft facet of the plurality of concentric draft facets is angled based in part on an index of refraction of the Fresnel lens to be congruent with conical surfaces of respective light cones that have corresponding vertices that originate from respective focal points, wherein each respective light cone extends through the Fresnel lens at an angle based in part on the index of refraction of the Fresnel lens and extends beyond the grooved surface into free space.

6. A Fresnel lens comprising:

a grooved convex exterior surface and a smooth concave interior surface, the grooved convex exterior surface comprising a plurality of concentric sloped facets and a plurality of concentric draft facets, pairs of concentric draft facets and concentric sloped facets forming a plurality of concentric grooves in the grooved convex exterior surface, the concentric sloped facets configured to focus light received from the grooved convex exterior surface to the smooth concave interior surface toward an eye of a nominal user;

wherein the Fresnel lens comprises an axis of symmetry about which the Fresnel lens is symmetric, wherein at least two of the plurality of concentric sloped facets are non-parallel with respect to the axis of symmetry.

7. The Fresnel lens of claim 6 wherein at least some of the plurality of concentric draft facets are angled based in part on an index of refraction of the Fresnel lens to be congruent with conical surfaces of respective light cones that have corresponding vertices that originate from respective focal points, wherein each respective light cone extends through the Fresnel lens at an angle based in part on the index of refraction of the Fresnel lens and extends beyond the grooved surface into free space.

8. A head-mountable apparatus comprising:

a first pair of Fresnel lenses, each Fresnel lens of the first pair of Fresnel lenses being curved and comprising:

a grooved surface and a smooth surface, the grooved surface comprising a plurality of concentric sloped facets and a plurality of concentric draft facets, pairs of concentric draft facets and concentric sloped facets forming a plurality of concentric grooves in the grooved surface, the plurality of concentric sloped facets configured to focus light received from the grooved surface to the smooth surface toward an eye of a nominal user;

at least some of the plurality of concentric draft facets being angled based in part on an index of refraction of the Fresnel lens to be aligned with conical surfaces of respective light cones that have corresponding vertices that originate from respective focal points, wherein each respective light cone extends through the Fresnel lens at an angle based in part on the index of refraction of the Fresnel lens and extends beyond the grooved surface into free space.

9. The head-mountable apparatus of claim 8 wherein the grooved surface is a grooved convex surface, and the smooth surface is a smooth concave surface.

10. The head-mountable apparatus of claim 8, further comprising:

a frame including two lens-holding structures, each lens-holding structure of the two lens-holding structures configured to hold a respective Fresnel lens of the first pair of Fresnel lenses.

11. The head-mountable apparatus of claim 10, further comprising a second pair of Fresnel lenses, each Fresnel lens of the second pair of Fresnel lenses comprising:

a grooved surface and a smooth surface, the grooved surface comprising a plurality of concentric sloped facets and a plurality of concentric draft facets, pairs of concentric draft facets and concentric sloped facets forming a plurality of concentric grooves in the grooved surface, the plurality of concentric sloped facets configured to focus light received from the grooved surface to the smooth surface toward an eye of a nominal user;

at least some of the plurality of concentric draft facets being angled based in part on an index of refraction of the Fresnel lens to be aligned with conical surfaces of respective light cones that have corresponding vertices that originate from respective focal points, wherein each respective light cone extends through the Fresnel lens at an angle based in part on an index of refraction of the Fresnel lens and extends beyond the grooved surface into free space;

wherein each lens-holding structure is configured to hold a respective Fresnel lens of the first pair of Fresnel lenses and a respective Fresnel lens of the second pair of Fresnel lenses.

12. The head-mountable apparatus of claim 11 wherein the grooved surface is a grooved convex surface, and the smooth surface is a smooth concave surface.

13. A Fresnel lens comprising:

a grooved surface and a smooth surface, the grooved surface comprising a plurality of concentric sloped facets and a plurality of concentric draft facets, pairs of concentric draft facets and concentric sloped facets forming a plurality of concentric grooves in the grooved surface, the plurality of concentric sloped facets configured to focus light received from the grooved surface to the smooth surface toward an eye of a nominal user;

at least some of the plurality of concentric draft facets being oriented to remove ring artifacts caused by external or internal light.

14. The Fresnel lens of claim 13 wherein the grooved surface is a grooved convex surface, and the smooth surface is a smooth concave surface.

15. The Fresnel lens of claim 13 wherein the at least some of the plurality of concentric draft facets are oriented to remove ring artifacts caused by external or internal light based in part on an index of refraction of the Fresnel lens.

16. The Fresnel lens of claim 13 wherein the at least some of the plurality of concentric draft facets are oriented to remove ring artifacts caused by external or internal light by being congruent with conical surfaces of respective light cones that have corresponding vertices that originate from respective focal points, wherein each respective light cone extends through the Fresnel lens at an angle based in part on an index of refraction of the Fresnel lens and extends beyond the grooved surface into free space.

17. A single curved Fresnel lens comprising:
a first grooved convex surface, the first grooved convex surface comprising a plurality of first concentric sloped facets and a plurality of first concentric draft facets, pairs of first concentric draft facets and first concentric sloped facets forming a plurality of first concentric grooves in the first grooved convex surface, the plurality of first concentric sloped facets configured to focus light toward an eye of a nominal user; and
a second grooved concave surface, the second grooved concave surface comprising a plurality of second concentric sloped facets and a plurality of second concentric draft facets, pairs of second concentric draft facets and second concentric sloped facets forming a plurality of second concentric grooves in the second grooved concave surface, the plurality of second concentric sloped facets configured to focus light toward the eye of the nominal user;
wherein the plurality of first concentric sloped facets are configured to focus light received from the first grooved convex surface to the second grooved concave surface toward the eye of the nominal user and at least some of the plurality of first concentric draft facets are angled based in part on an index of refraction of the Fresnel lens to be congruent with conical surfaces of respective light cones that have corresponding vertices that originate from respective focal points, wherein each respective light cone extends through the Fresnel lens at an angle based in part on the index of refraction of the Fresnel lens and extends beyond the first grooved convex surface into free space.

* * * * *